US010521669B2

(12) United States Patent
Dayal et al.

(10) Patent No.: US 10,521,669 B2
(45) Date of Patent: Dec. 31, 2019

(54) SYSTEM AND METHOD FOR PROVIDING GUIDANCE OR FEEDBACK TO A USER

(71) Applicant: Toyota Motor Engineering & Manufacturing North America, Inc., Erlanger, KY (US)

(72) Inventors: Rajiv Dayal, Milpitas, CA (US); Tiffany L. Chen, San Jose, CA (US); Patrick K. Ching, San Jose, CA (US); Brandon D. Northcutt, San Jose, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 8 days.

(21) Appl. No.: 15/351,321

(22) Filed: Nov. 14, 2016

(65) Prior Publication Data
US 2018/0137359 A1    May 17, 2018

(51) Int. Cl.
*G06K 9/00* (2006.01)
*G06F 3/01* (2006.01)
(Continued)

(52) U.S. Cl.
CPC ......... *G06K 9/00684* (2013.01); *G06F 3/016* (2013.01); *G06F 3/167* (2013.01);
(Continued)

(58) Field of Classification Search
None
See application file for complete search history.

(56) References Cited

U.S. PATENT DOCUMENTS

| 4,520,501 A | 5/1985 | DuBrucq |
| 4,586,827 A | 5/1986 | Hirsch et al. |

(Continued)

FOREIGN PATENT DOCUMENTS

| CN | 201260746 | 6/2009 |
| CN | 101527093 | 9/2009 |

(Continued)

OTHER PUBLICATIONS

Zhang, Shanjun; Yoshino, Kazuyoshi; A Braille Recognition System by the Mobile Phone with Embedded Camera; 2007; IEEE.
(Continued)

*Primary Examiner* — David Perlman
(74) *Attorney, Agent, or Firm* — Snell & Wilmer LLP

(57) ABSTRACT

A device for providing guidance or feedback to a user. The device includes a camera configured to detect image data indicating a user performance of an activity. The system includes a guidance unit connected to the camera. The guidance unit is configured to identify the activity based on image processing of the image data or an identification of the activity from the user. The guidance unit is also configured to determine a criteria associated with the activity. The guidance unit is also configured to determine a user performance of the activity based on the image data. The guidance unit is also configured to determine feedback based on a comparison of the criteria and the user performance of the activity, the feedback indicating an improvement or suggestion for the user. The system also includes an output unit connected to the guidance unit, the output unit configured to output the feedback.

12 Claims, 8 Drawing Sheets

(51) Int. Cl.
  *G06F 3/16* (2006.01)
  *G09B 5/04* (2006.01)
  *G09B 19/00* (2006.01)
(52) U.S. Cl.
  CPC ........... *G09B 5/04* (2013.01); *G09B 19/0038* (2013.01); *G09B 19/0092* (2013.01)

(56) References Cited

U.S. PATENT DOCUMENTS

| | | |
|---|---|---|
| 4,786,966 A | 11/1988 | Hanson |
| 5,047,952 A | 9/1991 | Kramer |
| 5,097,856 A | 3/1992 | Chi-Sheng |
| 5,129,716 A | 7/1992 | Holakovszky et al. |
| 5,233,520 A | 8/1993 | Kretsch et al. |
| 5,265,272 A | 11/1993 | Kurcbart |
| 5,463,428 A | 10/1995 | Lipton et al. |
| 5,508,699 A | 4/1996 | Silverman |
| 5,539,665 A | 7/1996 | Lamming et al. |
| 5,543,802 A | 8/1996 | Villevieille et al. |
| 5,544,050 A | 8/1996 | Abe |
| 5,568,127 A | 10/1996 | Bang |
| 5,636,038 A | 6/1997 | Lynt |
| 5,659,764 A | 8/1997 | Sakiyama |
| 5,701,356 A | 12/1997 | Stanford et al. |
| 5,733,127 A | 3/1998 | Mecum |
| 5,807,111 A | 9/1998 | Schrader |
| 5,872,744 A | 2/1999 | Taylor |
| 5,953,693 A | 9/1999 | Sakiyama |
| 5,956,630 A | 9/1999 | Mackey |
| 5,982,286 A | 11/1999 | Vanmoor |
| 6,009,577 A | 1/2000 | Day |
| 6,055,048 A | 4/2000 | Langevin et al. |
| 6,067,112 A | 5/2000 | Wellner et al. |
| 6,199,010 B1 | 3/2001 | Richton |
| 6,229,901 B1 | 5/2001 | Mickelson et al. |
| 6,230,135 B1 | 5/2001 | Ramsay |
| 6,230,349 B1 | 5/2001 | Silver et al. |
| 6,285,757 B1 | 9/2001 | Carroll et al. |
| 6,307,526 B1 | 10/2001 | Mann |
| 6,323,807 B1 | 11/2001 | Golding et al. |
| 6,349,001 B1 | 2/2002 | Spitzer |
| 6,466,232 B1 | 10/2002 | Newell et al. |
| 6,477,239 B1 | 11/2002 | Ohki |
| 6,542,623 B1 | 4/2003 | Kahn |
| 6,580,999 B2 | 6/2003 | Maruyama et al. |
| 6,594,370 B1 | 7/2003 | Anderson |
| 6,603,863 B1 | 8/2003 | Nagayoshi |
| 6,619,836 B1 | 9/2003 | Silvant et al. |
| 6,701,296 B1 | 3/2004 | Kramer |
| 6,774,788 B1 | 8/2004 | Balfe |
| 6,825,875 B1 | 11/2004 | Strub et al. |
| 6,826,477 B2 | 11/2004 | Ladetto et al. |
| 6,834,373 B2 | 12/2004 | Dieberger |
| 6,839,667 B2 | 1/2005 | Reich |
| 6,857,775 B1 | 2/2005 | Wilson |
| 6,920,229 B2 | 7/2005 | Boesen |
| D513,997 S | 1/2006 | Wilson |
| 7,027,874 B1 | 4/2006 | Sawan et al. |
| D522,300 S | 6/2006 | Roberts |
| 7,069,215 B1 | 6/2006 | Bangalore |
| 7,106,220 B2 | 9/2006 | Gourgey et al. |
| 7,228,275 B1 | 6/2007 | Endo |
| 7,299,034 B2 | 11/2007 | Kates |
| 7,308,314 B2 | 12/2007 | Havey et al. |
| 7,336,226 B2 | 2/2008 | Jung et al. |
| 7,356,473 B2 | 4/2008 | Kates |
| 7,413,554 B2 | 8/2008 | Kobayashi et al. |
| 7,417,592 B1 | 8/2008 | Hsiao et al. |
| 7,428,429 B2 | 9/2008 | Gantz et al. |
| 7,463,188 B1 | 12/2008 | McBurney |
| 7,496,445 B2 | 2/2009 | Mohsini et al. |
| 7,501,958 B2 | 3/2009 | Saltzstein et al. |
| 7,525,568 B2 | 4/2009 | Raghunath |
| 7,564,469 B2 | 7/2009 | Cohen |
| 7,565,295 B1 | 7/2009 | Hernandez-Rebollar |
| 7,598,976 B2 | 10/2009 | Sofer et al. |
| 7,618,260 B2 | 11/2009 | Daniel et al. |
| D609,818 S | 2/2010 | Tsang et al. |
| 7,656,290 B2 | 2/2010 | Fein et al. |
| 7,659,915 B2 | 2/2010 | Kurzweil et al. |
| 7,743,996 B2 | 6/2010 | Maciver |
| D625,427 S | 10/2010 | Lee |
| 7,843,351 B2 | 11/2010 | Bourne |
| 7,843,488 B2 | 11/2010 | Stapleton |
| 7,848,512 B2 | 12/2010 | Eldracher |
| 7,864,991 B2 | 1/2011 | Espenlaub et al. |
| 7,938,756 B2 | 5/2011 | Rodetsky et al. |
| 7,991,576 B2 | 8/2011 | Roumeliotis |
| 8,005,263 B2 | 8/2011 | Fujimura |
| 8,035,519 B2 | 10/2011 | Davis |
| D649,655 S | 11/2011 | Petersen |
| 8,123,660 B2 | 2/2012 | Kruse et al. |
| D656,480 S | 3/2012 | McManigal et al. |
| 8,138,907 B2 | 3/2012 | Barbeau et al. |
| 8,150,107 B2 | 4/2012 | Kurzweil et al. |
| 8,177,705 B2 | 5/2012 | Abolfathi |
| 8,239,032 B2 | 8/2012 | Dewhurst |
| 8,253,760 B2 | 8/2012 | Sako et al. |
| 8,300,862 B2 | 10/2012 | Newton et al. |
| 8,325,263 B2 | 12/2012 | Kato et al. |
| D674,501 S | 1/2013 | Petersen |
| 8,359,122 B2 | 1/2013 | Koselka et al. |
| 8,395,968 B2 | 3/2013 | Vartanian et al. |
| 8,401,785 B2 | 3/2013 | Cho et al. |
| 8,414,246 B2 | 4/2013 | Tobey |
| 8,418,705 B2 | 4/2013 | Ota et al. |
| 8,428,643 B2 | 4/2013 | Lin |
| 8,483,956 B2 | 7/2013 | Zhang |
| 8,494,507 B1 | 7/2013 | Tedesco et al. |
| 8,494,859 B2 | 7/2013 | Said |
| 8,538,687 B2 | 9/2013 | Plocher et al. |
| 8,538,688 B2 | 9/2013 | Prehofer |
| 8,571,860 B2 | 10/2013 | Strope |
| 8,583,282 B2 | 11/2013 | Angle et al. |
| 8,588,464 B2 | 11/2013 | Albertson et al. |
| 8,588,972 B2 | 11/2013 | Fung |
| 8,591,412 B2 | 11/2013 | Kovarik et al. |
| 8,594,935 B2 | 11/2013 | Cioffi et al. |
| 8,606,316 B2 | 12/2013 | Evanitsky |
| 8,610,879 B2 | 12/2013 | Ben-Moshe et al. |
| 8,630,633 B1 | 1/2014 | Tedesco et al. |
| 8,676,274 B2 | 3/2014 | Li |
| 8,676,623 B2 | 3/2014 | Gale et al. |
| 8,694,251 B2 | 4/2014 | Janardhanan et al. |
| 8,704,902 B2 | 4/2014 | Naick et al. |
| 8,718,672 B2 | 5/2014 | Xie et al. |
| 8,743,145 B1 | 6/2014 | Price |
| 8,750,898 B2 | 6/2014 | Haney |
| 8,768,071 B2 | 7/2014 | Tsuchinaga et al. |
| 8,786,680 B2 | 7/2014 | Shiratori et al. |
| 8,797,141 B2 | 8/2014 | Best et al. |
| 8,797,386 B2 | 8/2014 | Chou et al. |
| 8,803,699 B2 | 8/2014 | Foshee et al. |
| 8,805,929 B2 | 8/2014 | Erol et al. |
| 8,812,244 B2 | 8/2014 | Angelides |
| 8,814,019 B2 | 8/2014 | Dyster et al. |
| 8,825,398 B2 | 9/2014 | Alexandre et al. |
| 8,836,532 B2 | 9/2014 | Fish, Jr. et al. |
| 8,836,580 B2 | 9/2014 | Mendelson |
| 8,836,910 B2 | 9/2014 | Cashin et al. |
| 8,902,303 B2 | 12/2014 | Na'Aman et al. |
| 8,909,534 B1 | 12/2014 | Heath |
| D721,673 S | 1/2015 | Park et al. |
| 8,926,330 B2 | 1/2015 | Taghavi |
| 8,930,458 B2 | 1/2015 | Lewis et al. |
| 8,981,682 B2 | 3/2015 | Delson et al. |
| 8,994,498 B2 | 3/2015 | Agrafioti |
| D727,194 S | 4/2015 | Wilson |
| 9,004,330 B2 | 4/2015 | White |
| 9,025,016 B2 | 5/2015 | Wexler et al. |
| 9,042,596 B2 | 5/2015 | Connor |
| 9,053,094 B2 | 6/2015 | Yassa |
| 9,076,450 B1 | 7/2015 | Sadek |
| 9,081,079 B2 | 7/2015 | Chao et al. |

(56) References Cited

U.S. PATENT DOCUMENTS

| | | |
|---|---|---|
| 9,081,385 B1 | 7/2015 | Ferguson et al. |
| D736,741 S | 8/2015 | Katz |
| 9,111,545 B2 | 8/2015 | Jadhav et al. |
| D738,238 S | 9/2015 | Pede et al. |
| 9,137,484 B2 | 9/2015 | DiFrancesco et al. |
| 9,137,639 B2 | 9/2015 | Garin et al. |
| 9,140,554 B2 | 9/2015 | Jerauld |
| 9,148,191 B2 | 9/2015 | Teng et al. |
| 9,158,378 B2 | 10/2015 | Hirukawa |
| D742,535 S | 11/2015 | Wu |
| D743,933 S | 11/2015 | Park et al. |
| 9,185,489 B2 | 11/2015 | Gerber et al. |
| 9,190,058 B2 | 11/2015 | Klein |
| 9,104,806 B2 | 12/2015 | Stivoric et al. |
| 9,230,430 B2 | 1/2016 | Civelli et al. |
| 9,232,366 B1 | 1/2016 | Charlier et al. |
| 9,267,801 B2 | 2/2016 | Gupta et al. |
| 9,269,015 B2 | 2/2016 | Boncyk et al. |
| 9,275,376 B2 | 3/2016 | Barraclough et al. |
| 9,304,588 B2 | 4/2016 | Aldossary |
| D756,958 S | 5/2016 | Lee et al. |
| D756,959 S | 5/2016 | Lee et al. |
| 9,335,175 B2 | 5/2016 | Zhang et al. |
| 9,341,014 B2 | 5/2016 | Oshima et al. |
| 9,355,547 B2 | 5/2016 | Stevens et al. |
| 2001/0023387 A1 | 9/2001 | Rollo |
| 2002/0067282 A1 | 6/2002 | Moskowitz et al. |
| 2002/0071277 A1 | 6/2002 | Starner et al. |
| 2002/0075323 A1 | 6/2002 | O'Dell |
| 2002/0173346 A1 | 11/2002 | Wang |
| 2002/0178344 A1 | 11/2002 | Bourget |
| 2003/0026461 A1 | 2/2003 | Hunter |
| 2003/0133008 A1 | 7/2003 | Stephenson |
| 2003/0133085 A1 | 7/2003 | Tretiakoff |
| 2003/0179133 A1 | 9/2003 | Pepin et al. |
| 2004/0056907 A1 | 3/2004 | Sharma |
| 2004/0232179 A1 | 11/2004 | Chauhan |
| 2004/0267442 A1 | 12/2004 | Fehr et al. |
| 2005/0208457 A1 | 9/2005 | Fink et al. |
| 2005/0221260 A1 | 10/2005 | Kikuchi |
| 2005/0259035 A1 | 11/2005 | Iwaki |
| 2005/0283752 A1 | 12/2005 | Fruchter |
| 2006/0004512 A1 | 1/2006 | Herbst et al. |
| 2006/0028550 A1 | 2/2006 | Palmer, Jr. et al. |
| 2006/0029256 A1 | 2/2006 | Miyoshi et al. |
| 2006/0129308 A1 | 6/2006 | Kates |
| 2006/0171704 A1 | 8/2006 | Bingle et al. |
| 2006/0177086 A1 | 8/2006 | Rye et al. |
| 2006/0184318 A1 | 8/2006 | Yoshimine |
| 2006/0292533 A1 | 12/2006 | Selod |
| 2007/0001904 A1 | 1/2007 | Mendelson |
| 2007/0052672 A1 | 3/2007 | Ritter et al. |
| 2007/0173688 A1 | 7/2007 | Kim |
| 2007/0182812 A1 | 8/2007 | Ritchey |
| 2007/0202865 A1 | 8/2007 | Moride |
| 2007/0230786 A1 | 10/2007 | Foss |
| 2007/0296572 A1 | 12/2007 | Fein et al. |
| 2008/0024594 A1 | 1/2008 | Ritchey |
| 2008/0068559 A1 | 3/2008 | Howell et al. |
| 2008/0120029 A1 | 5/2008 | Zelek et al. |
| 2008/0144854 A1 | 6/2008 | Abreu |
| 2008/0145822 A1 | 6/2008 | Bucchieri |
| 2008/0174676 A1 | 7/2008 | Squilla et al. |
| 2008/0198222 A1 | 8/2008 | Gowda |
| 2008/0198324 A1 | 8/2008 | Fuziak |
| 2008/0208455 A1 | 8/2008 | Hartman |
| 2008/0251110 A1 | 10/2008 | Pede |
| 2008/0260210 A1 | 10/2008 | Kobeli |
| 2008/0318636 A1 | 12/2008 | Kim |
| 2009/0012788 A1 | 1/2009 | Gilbert |
| 2009/0040215 A1 | 2/2009 | Afzulpurkar |
| 2009/0058611 A1 | 3/2009 | Kawamura |
| 2009/0106016 A1 | 4/2009 | Athsani |
| 2009/0118652 A1 | 5/2009 | Carlucci |
| 2009/0122161 A1 | 5/2009 | Bolkhovitinov |
| 2009/0122648 A1 | 5/2009 | Mountain et al. |
| 2009/0157302 A1 | 6/2009 | Tashev et al. |
| 2009/0177437 A1 | 7/2009 | Roumeliotis |
| 2009/0189974 A1 | 7/2009 | Deering |
| 2009/0210596 A1 | 8/2009 | Furuya |
| 2010/0041378 A1 | 2/2010 | Aceves et al. |
| 2010/0080418 A1 | 4/2010 | Ito |
| 2010/0109918 A1 | 5/2010 | Liebermann |
| 2010/0110368 A1 | 5/2010 | Chaum |
| 2010/0179452 A1 | 7/2010 | Srinivasan |
| 2010/0182242 A1 | 7/2010 | Fields et al. |
| 2010/0182450 A1 | 7/2010 | Kumar et al. |
| 2010/0198494 A1 | 8/2010 | Chao et al. |
| 2010/0199232 A1 | 8/2010 | Mistry et al. |
| 2010/0223212 A1* | 9/2010 | Manolescu ............ G06Q 10/06 706/12 |
| 2010/0241350 A1 | 9/2010 | Cioffi et al. |
| 2010/0245585 A1 | 9/2010 | Fisher et al. |
| 2010/0267276 A1 | 10/2010 | Wu et al. |
| 2010/0292917 A1 | 11/2010 | Emam et al. |
| 2010/0298976 A1 | 11/2010 | Sugihara et al. |
| 2010/0305845 A1 | 12/2010 | Alexandre et al. |
| 2010/0308999 A1 | 12/2010 | Chornenky |
| 2011/0066383 A1 | 3/2011 | Jangle et al. |
| 2011/0071830 A1 | 3/2011 | Kim et al. |
| 2011/0092249 A1 | 4/2011 | Evanitsky |
| 2011/0124383 A1 | 5/2011 | Garra et al. |
| 2011/0125735 A1 | 5/2011 | Petrou |
| 2011/0181422 A1 | 7/2011 | Tran |
| 2011/0187640 A1 | 8/2011 | Jacobsen et al. |
| 2011/0211760 A1 | 9/2011 | Boncyk et al. |
| 2011/0216006 A1 | 9/2011 | Litschel |
| 2011/0221670 A1 | 9/2011 | King, III et al. |
| 2011/0234584 A1 | 9/2011 | Endo |
| 2011/0246064 A1 | 10/2011 | Nicholson |
| 2011/0260681 A1 | 10/2011 | Guccione et al. |
| 2011/0307172 A1 | 12/2011 | Jadhav et al. |
| 2012/0016578 A1 | 1/2012 | Coppens |
| 2012/0053826 A1 | 3/2012 | Slamka |
| 2012/0062357 A1 | 3/2012 | Slamka |
| 2012/0069511 A1 | 3/2012 | Azera |
| 2012/0075168 A1 | 3/2012 | Osterhout et al. |
| 2012/0082962 A1 | 4/2012 | Schmidt |
| 2012/0085377 A1 | 4/2012 | Trout |
| 2012/0092161 A1 | 4/2012 | West |
| 2012/0092460 A1 | 4/2012 | Mahoney |
| 2012/0123784 A1 | 5/2012 | Baker et al. |
| 2012/0136666 A1 | 5/2012 | Corpier et al. |
| 2012/0143495 A1 | 6/2012 | Dantu |
| 2012/0162423 A1 | 6/2012 | Xiao et al. |
| 2012/0194552 A1 | 8/2012 | Osterhout et al. |
| 2012/0206335 A1 | 8/2012 | Osterhout et al. |
| 2012/0206607 A1 | 8/2012 | Morioka |
| 2012/0207356 A1 | 8/2012 | Murphy |
| 2012/0214418 A1 | 8/2012 | Lee et al. |
| 2012/0220234 A1 | 8/2012 | Abreu |
| 2012/0232430 A1 | 9/2012 | Boissy et al. |
| 2012/0249797 A1 | 10/2012 | Haddick et al. |
| 2012/0252483 A1 | 10/2012 | Farmer et al. |
| 2012/0316884 A1 | 12/2012 | Rozaieski et al. |
| 2012/0323485 A1 | 12/2012 | Mutoh |
| 2012/0327194 A1 | 12/2012 | Shiratori |
| 2013/0002452 A1 | 1/2013 | Lauren |
| 2013/0044005 A1 | 2/2013 | Foshee et al. |
| 2013/0046541 A1 | 2/2013 | Klein et al. |
| 2013/0066636 A1 | 3/2013 | Singhal |
| 2013/0079061 A1 | 3/2013 | Jadhav |
| 2013/0090133 A1 | 4/2013 | D'Jesus Bencci |
| 2013/0115578 A1 | 5/2013 | Shiina |
| 2013/0115579 A1 | 5/2013 | Taghavi |
| 2013/0116559 A1 | 5/2013 | Levin et al. |
| 2013/0127980 A1 | 5/2013 | Haddick |
| 2013/0128051 A1 | 5/2013 | Velipasalar et al. |
| 2013/0131985 A1 | 5/2013 | Weiland et al. |
| 2013/0141576 A1 | 6/2013 | Lord et al. |
| 2013/0144629 A1 | 6/2013 | Johnston |
| 2013/0155474 A1 | 6/2013 | Roach et al. |
| 2013/0157230 A1 | 6/2013 | Morgan |
| 2013/0184982 A1 | 7/2013 | DeLuca et al. |

(56) References Cited

U.S. PATENT DOCUMENTS

| | | |
|---|---|---|
| 2013/0201344 A1 | 8/2013 | Sweet, III |
| 2013/0202274 A1 | 8/2013 | Chan |
| 2013/0204605 A1 | 8/2013 | Illgner-Fehns |
| 2013/0211718 A1 | 8/2013 | Yoo et al. |
| 2013/0218456 A1 | 8/2013 | Zelek et al. |
| 2013/0228615 A1 | 9/2013 | Gates et al. |
| 2013/0229669 A1 | 9/2013 | Smits |
| 2013/0243250 A1 | 9/2013 | France |
| 2013/0245396 A1 | 9/2013 | Berman et al. |
| 2013/0250078 A1 | 9/2013 | Levy |
| 2013/0250233 A1 | 9/2013 | Blum et al. |
| 2013/0253818 A1 | 9/2013 | Sanders et al. |
| 2013/0265450 A1 | 10/2013 | Barnes, Jr. |
| 2013/0271584 A1 | 10/2013 | Wexler et al. |
| 2013/0290909 A1 | 10/2013 | Gray |
| 2013/0307842 A1 | 11/2013 | Grinberg et al. |
| 2013/0311179 A1 | 11/2013 | Wagner |
| 2013/0328683 A1 | 12/2013 | Sitbon et al. |
| 2013/0332452 A1 | 12/2013 | Jarvis |
| 2014/0009561 A1 | 1/2014 | Sutherland et al. |
| 2014/0031081 A1 | 1/2014 | Vossoughi et al. |
| 2014/0031977 A1 | 1/2014 | Goldenberg et al. |
| 2014/0032596 A1 | 1/2014 | Fish et al. |
| 2014/0037149 A1 | 2/2014 | Zetune |
| 2014/0055353 A1 | 2/2014 | Takahama |
| 2014/0071234 A1 | 3/2014 | Millett |
| 2014/0081631 A1 | 3/2014 | Zhu et al. |
| 2014/0085446 A1 | 3/2014 | Hicks |
| 2014/0098018 A1 | 4/2014 | Kim et al. |
| 2014/0100773 A1 | 4/2014 | Cunningham et al. |
| 2014/0125700 A1 | 5/2014 | Ramachandran et al. |
| 2014/0132388 A1 | 5/2014 | Alalawi |
| 2014/0133290 A1 | 5/2014 | Yokoo |
| 2014/0160250 A1 | 6/2014 | Pomerantz |
| 2014/0184384 A1 | 7/2014 | Zhu et al. |
| 2014/0184775 A1 | 7/2014 | Drake |
| 2014/0204245 A1 | 7/2014 | Wexler |
| 2014/0222023 A1 | 8/2014 | Kim et al. |
| 2014/0233859 A1 | 8/2014 | Cho |
| 2014/0236932 A1 | 8/2014 | Ikonomov |
| 2014/0249847 A1 | 9/2014 | Soon-Shiong |
| 2014/0251396 A1 | 9/2014 | Subhashrao et al. |
| 2014/0253702 A1 | 9/2014 | Wexler et al. |
| 2014/0278070 A1 | 9/2014 | McGavran et al. |
| 2014/0281943 A1 | 9/2014 | Prilepov |
| 2014/0287382 A1 | 9/2014 | Villar Cloquell |
| 2014/0309806 A1 | 10/2014 | Ricci |
| 2014/0313040 A1 | 10/2014 | Wright, Sr. |
| 2014/0335893 A1 | 11/2014 | Ronen |
| 2014/0343846 A1 | 11/2014 | Goldman et al. |
| 2014/0345956 A1 | 11/2014 | Kojina |
| 2014/0347265 A1 | 11/2014 | Aimone |
| 2014/0368412 A1 | 12/2014 | Jacobsen et al. |
| 2014/0369541 A1 | 12/2014 | Miskin et al. |
| 2014/0379251 A1 | 12/2014 | Tolstedt |
| 2014/0379336 A1 | 12/2014 | Bhatnager |
| 2015/0002808 A1 | 1/2015 | Rizzo, III et al. |
| 2015/0016035 A1 | 1/2015 | Tussy |
| 2015/0058237 A1 | 2/2015 | Bailey |
| 2015/0063661 A1 | 3/2015 | Lee et al. |
| 2015/0081884 A1 | 3/2015 | Maguire et al. |
| 2015/0099946 A1 | 4/2015 | Sahin |
| 2015/0109107 A1 | 4/2015 | Gomez et al. |
| 2015/0120186 A1 | 4/2015 | Heikes et al. |
| 2015/0125831 A1 | 5/2015 | Chandrashekhar Nair et al. |
| 2015/0135310 A1 | 5/2015 | Lee |
| 2015/0141085 A1 | 5/2015 | Nuovo et al. |
| 2015/0142891 A1 | 5/2015 | Haque et al. |
| 2015/0154643 A1 | 6/2015 | Artman et al. |
| 2015/0196101 A1 | 7/2015 | Dayal et al. |
| 2015/0198454 A1 | 7/2015 | Moore et al. |
| 2015/0198455 A1 | 7/2015 | Chen et al. |
| 2015/0199566 A1 | 7/2015 | Moore et al. |
| 2015/0201181 A1* | 7/2015 | Moore .................. G06F 3/016 348/47 |
| 2015/0211858 A1 | 7/2015 | Jerauld |
| 2015/0219757 A1 | 8/2015 | Boelter et al. |
| 2015/0223355 A1 | 8/2015 | Fleck |
| 2015/0256977 A1 | 9/2015 | Huang |
| 2015/0257555 A1 | 9/2015 | Wong |
| 2015/0260474 A1 | 9/2015 | Rublowsky et al. |
| 2015/0262509 A1 | 9/2015 | Labbe et al. |
| 2015/0279172 A1 | 10/2015 | Hyde |
| 2015/0324646 A1 | 11/2015 | Kimia |
| 2015/0330787 A1 | 11/2015 | Cioffi et al. |
| 2015/0336276 A1 | 11/2015 | Song et al. |
| 2015/0338917 A1 | 11/2015 | Steiner et al. |
| 2015/0341591 A1 | 11/2015 | Kelder et al. |
| 2015/0346496 A1 | 12/2015 | Haddick et al. |
| 2015/0356345 A1 | 12/2015 | Velozo |
| 2015/0356837 A1 | 12/2015 | Pajestka et al. |
| 2015/0364943 A1 | 12/2015 | Vick et al. |
| 2015/0367176 A1 | 12/2015 | Bejestan |
| 2015/0375395 A1 | 12/2015 | Kwon et al. |
| 2016/0007158 A1 | 1/2016 | Venkatraman |
| 2016/0027325 A1* | 1/2016 | Malhotra ............ G06F 19/3481 434/252 |
| 2016/0028917 A1 | 1/2016 | Wexler |
| 2016/0042228 A1 | 2/2016 | Opalka |
| 2016/0067584 A1* | 3/2016 | Giedwoyn ............ A61B 5/112 700/91 |
| 2016/0078289 A1 | 3/2016 | Michel |
| 2016/0098138 A1 | 4/2016 | Park |
| 2016/0156850 A1 | 6/2016 | Werblin et al. |
| 2016/0198319 A1 | 7/2016 | Huang |
| 2016/0350514 A1 | 12/2016 | Rajendran |
| 2017/0032191 A1* | 2/2017 | Ackland ............ G06K 9/00724 |
| 2017/0092142 A1* | 3/2017 | Dow .................. G09B 5/02 |
| 2017/0286766 A1* | 10/2017 | Castelli ................ G06F 16/258 |
| 2017/0308753 A1* | 10/2017 | Wu .................... G06K 9/00718 |

FOREIGN PATENT DOCUMENTS

| | | |
|---|---|---|
| CN | 201440733 | 4/2010 |
| CN | 101803988 | 8/2010 |
| CN | 101647745 | 1/2011 |
| CN | 102316193 | 1/2012 |
| CN | 102631280 | 8/2012 |
| CN | 202547659 | 11/2012 |
| CN | 202722736 | 2/2013 |
| CN | 102323819 | 6/2013 |
| CN | 103445920 | 12/2013 |
| DE | 102011080056 | 1/2013 |
| DE | 102012000587 | 7/2013 |
| DE | 102012202614 | 8/2013 |
| EP | 1174049 | 9/2004 |
| EP | 1721237 | 11/2006 |
| EP | 2368455 | 9/2011 |
| EP | 2371339 | 10/2011 |
| EP | 2127033 | 8/2012 |
| EP | 2581856 | 4/2013 |
| EP | 2751775 | 7/2016 |
| FR | 2885251 | 11/2006 |
| GB | 2401752 | 11/2004 |
| JP | 1069539 | 3/1998 |
| JP | 2001304908 | 10/2001 |
| JP | 2010012529 | 1/2010 |
| JP | 2010182193 | 8/2010 |
| JP | 4727352 | 7/2011 |
| JP | 2013169611 | 9/2013 |
| KR | 100405636 | 11/2003 |
| KR | 20080080688 | 9/2008 |
| KR | 20120020212 | 3/2012 |
| KR | 1250929 | 4/2013 |
| WO | WO 1995/004440 | 2/1995 |
| WO | WO 9949656 | 9/1999 |
| WO | WO 0010073 | 2/2000 |
| WO | WO 0038393 | 6/2000 |
| WO | WO 0179956 | 10/2001 |
| WO | WO 2004/076974 | 9/2004 |
| WO | WO 2006/028354 | 3/2006 |
| WO | WO 2006/045819 | 5/2006 |
| WO | WO 2007/031782 | 3/2007 |
| WO | WO 2008/015375 | 2/2008 |

(56) References Cited

FOREIGN PATENT DOCUMENTS

| WO | WO 2008/035993 | 3/2008 |
|---|---|---|
| WO | WO 2008/008791 | 4/2008 |
| WO | WO 2008/096134 | 8/2008 |
| WO | WO 2008/127316 | 10/2008 |
| WO | WO 2010/062481 | 6/2010 |
| WO | WO 2010/109313 | 9/2010 |
| WO | WO 2012/040703 | 3/2012 |
| WO | WO 2012/163675 | 12/2012 |
| WO | WO 2013/045557 | 4/2013 |
| WO | WO 2013/054257 | 4/2013 |
| WO | WO 2013/067539 | 5/2013 |
| WO | WO 2013/147704 | 10/2013 |
| WO | WO 2014/104531 | 7/2014 |
| WO | WO 2014/138123 | 9/2014 |
| WO | WO 2014/172378 | 10/2014 |
| WO | WO 2015/065418 | 5/2015 |
| WO | WO 2015/092533 | 6/2015 |
| WO | WO 2015/108882 | 7/2015 |
| WO | WO 2015/127062 | 8/2015 |

OTHER PUBLICATIONS

Diallo, Amadou; Sep. 18, 2014; Apple iOS8: Top New Features, Forbes Magazine.

N. Kalar, T. Lawers, D. Dewey, T. Stepleton, M.B. Dias; Iterative Design of a Braille Writing Tutor to Combat Illiteracy; Aug. 30, 2007; IEEE.

AlZuhair et al.; "*NFC Based Applications for Visually Impaired People—A Review*"; IEEE International Conference on Multimedia and Expo Workshops (ICMEW), Jul. 14, 2014; 7 pages.

"Light Detector" *EveryWare Technologies*; 2 pages; Jun. 18, 2016.

Aggarwal et al.; "All-in-One Companion for Visually Impaired;" *International Journal of Computer Applications*; vol. 79, No. 14; pp. 37-40; Oct. 2013.

AppleVis; *An Introduction to Braille Screen Input on iOS 8*; http://www.applevis.com/guides/braille-ios/introduction-braille-screen-input-ios-8, Nov. 16, 2014; 7 pages.

Arati et al. "Object Recognition in Mobile Phone Application for Visually Impaired Users;" *IOSR Journal of Computer Engineering (IOSR-JCE)*; vol. 17, No. 1; pp. 30-33; Jan. 2015.

Bharathi et al.; "Effective Navigation for Visually Impaired by Wearable Obstacle Avoidance System;" *2012 International Conference on Computing, Electronics and Electrical Technologies (ICCEET)*; pp. 956-958; 2012.

Bhatlawande et al.; "*Way-finding Electronic Bracelet for Visually Impaired People*"; IEEE Point-of-Care Healthcare Technologies (PHT), Jan. 16-18, 2013; 4 pages.

Bigham et al.; "*VizWiz: Nearly Real-Time Answers to Visual Questions*" Proceedings of the 23nd annual ACM symposium on User interface software and technology; 2010; 2 pages.

Blaze Engineering; "*Visually Impaired Resource Guide: Assistave Technology for Students who use Braille*"; Braille 'n Speak Manual; http://www.blaize.com; Nov. 17, 2014; 5 pages.

Blenkhorn et al.; "*An Ultrasonic Mobility Device with Minimal Audio Feedback*"; Center on Disabilities Technology and Persons with Disabilities Conference; Nov. 22, 1997; 5 pages.

Borenstein et al.; "*The GuideCane—A Computerized Travel Aid for the Active Guidance of Blind Pedestrians*"; IEEE International Conference on Robotics and Automation; Apr. 21-27, 1997; 6 pages.

Bujacz et al.; "*Remote Guidance for the Blind—A Proposed Teleassistance System and Navigation Trials*"; Conference on Human System Interactions; May 25-27, 2008; 6 pages.

Burbey et al.; "*Human Information Processing with the Personal Memex*"; ISE 5604 Fall 2005; Dec. 6, 2005; 88 pages.

Campos et al.; "*Design and Evaluation of a Spoken-Feedback Keyboard*"; Department of Information Systems and Computer Science, INESC-ID/IST/Universidade Tecnica de Lisboa, Jul. 2004; 6 pages.

Caperna et al.; "*A Navigation and Object Location Device for the Blind*"; Tech. rep. University of Maryland College Park; May 2009; 129 pages.

Cardonha et al.; "*A Crowdsourcing Platform for the Construction of Accessibility Maps*"; W4A'13 Proceedings of the 10$^{th}$ International Cross-Disciplinary Conference on Web Accessibility; Article No. 26; 2013; 5 pages.

Chaudary et al.; "*Alternative Navigation Assistance Aids for Visually Impaired Blind Persons*"; Proceedings of ICEAPVI; Feb. 12-14, 2015; 5 pages.

Coughlan et al.; "*Crosswatch: A System for Providing Guidance to Visually Impaired Travelers at Traffic Intersections*"; Journal of Assistive Technologies 7.2; 2013; 17 pages.

D'Andrea, Frances Mary; "*More than a Perkins Brailler: A Review of the Mountbatten Brailler, Part 1*"; AFB AccessWorld Magazine; vol. 6, No. 1, Jan. 2005; 9 pages.

De Choudhury et al. "Automatic Construction of Travel Itineraries Using Social Breadcrumbs," pp. 35-44; Jun. 2010.

Dias et al.; "*Enhancing an Automated Braille Writing Tutor*"; IEEE/RSJ International Conference on Intelligent Robots and Systems; Oct. 11-15, 2009; 7 pages.

Dowling et al.; "*Intelligent Image Processing Constraints for Blind Mobility Facilitated Through Artificial Vision*"; 8$^{th}$ Australian and NewZealand Intelligent Information Systems Conference (ANZIIS); Dec. 10-12, 2003; 7 pages.

Ebay; Matin (Made in Korea) Neoprene Canon DSLR Camera Curved Neck Strap #6782; http://www.ebay.com/itm/MATIN-Made-in-Korea-Neoprene-Canon-DSLR-Camera-Curved-Neck-Strap-6782-/281608526018?hash=item41912d18c2:g:~pMAAOSwe-FU6zDa ; 4 pages..

Eccles, Lisa; "*Smart Walker Detects Obstacles*"; Electronic Design; http://electronicdesign.com/electromechanical/smart-walker-detects-obstacles; Aug. 20, 2001; 2 pages.

Frizera et al.; "*The Smart Walkers as Geriatric Assistive Device. The SIMBIOSIS Purpose*"; Gerontechnology, vol. 7, No. 2; Jan. 30, 2008; 6 pages.

Garaj et al.; "*A System for Remote Sighted Guidance of Visually Impaired Pedestrians*"; The British Journal of Visual Impairment; vol. 21, No. 2, 2003; 9 pages.

Ghiani, et al.; "*Vibrotactile Feedback to Aid Blind Users of Mobile Guides*"; Journal of Visual Languages and Computing 20; 2009; 13 pages.

Glover et al.; "*A Robotically-Augmented Walker for Older Adults*"; Carnegie Mellon University, School of Computer Science; Aug. 1, 2003; 13 pages.

Graf, Christian; "*Verbally Annotated Tactile Maps—Challenges and Approaches*"; Spatial Cognition VII, vol. 6222; Aug. 15-19, 2010; 16 pages.

Graft, Birgit; "*An Adaptive Guidance System for Robotic Walking Aids*"; Journal of Computing and Information Technology—CIT 17; 2009; 12 pages.

Greenberg et al.; "*Finding Your Way: A Curriculum for Teaching and Using the Braillenote with Sendero GPS 2011*"; California School for the Blind; 2011; 190 pages.

Guerrero et al.; "*An Indoor Navigation System for the Visually Impaired*"; Sensors vol. 12, Issue 6; Jun. 13, 2012; 23 pages.

Guy et al; "*CrossingGuard: Exploring Information Content in Navigation Aids for Visually Impaired Pedestrians*" Proceedings of the SIGCHI Conference on Human Factors in Computing Systems; May 5-10, 2012; 10 pages.

Hamid, Nazatul Naquiah Abd; "*Facilitating Route Learning Using Interactive Audio-Tactile Maps for Blind and Visually Impaired People*"; CHI 2013 Extended Abstracts; Apr. 27, 2013; 6 pages.

Helal et al.; "*Drishti: An Integrated Navigation System for Visually Impaired and Disabled*"; Fifth International Symposium on Wearable Computers; Oct. 8-9, 2001; 8 pages.

Hesch et al.; "*Design and Analysis of a Portable Indoor Localization Aid for the Visually Impaired*"; International Journal of Robotics Research; vol. 29; Issue 11; Sep. 2010; 15 pgs.

Heyes, Tony; "*The Sonic Pathfinder an Electronic Travel Aid for the Vision Impaired*"; http://members.optuszoo.com.au/aheyew40/pa/pf_blerf.html; Dec. 11, 2014; 7 pages.

(56) References Cited

OTHER PUBLICATIONS

Joseph et al.; "Visual Semantic Parameterization—To Enhance Blind User Perception for Indoor Navigation"; Multimedia and Expo Workshops (ICMEW), 2013 IEEE International Conference; Jul. 15, 2013; 7 pages.

Kalra et al.; "A Braille Writing Tutor to Combat Illiteracy in Developing Communities"; Carnegie Mellon University Research Showcase, Robotics Institute; 2007; 10 pages.

Kammoun et al.; "Towards a Geographic Information System Facilitating Navigation of Visually Impaired Users"; Springer Berlin Heidelberg; 2012; 8 pages.

Kayama et al.; "Outdoor Environment Recognition and Semi-Autonomous Mobile Vehicle for Supporting Mobility of the Elderly and Disabled People"; National Institute of Information and Communications Technology, vol. 54, No. 3; Aug. 2007; 11 pages.

Kirinic et al.; "Computers in Education of Children with Intellectual and Related Developmental Disorders"; International Journal of Emerging Technologies in Learning, vol. 5, 2010, 5 pages.

Krishna et al.; "A Systematic Requirements Analysis and Development of an Assistive Device to Enhance the Social Interaction of People Who are Blind or Visually Impaired"; Workshop on Computer Vision Applications for the Visually Impaired; Marseille, France; 2008; 12 pages.

Kumar et al.; "An Electronic Travel Aid for Navigation of Visually Impaired Persons"; Communications Systems and Networks (COMSNETS), 2011 Third International Conference; Jan. 2011; 5 pages.

Lee et al.; "Adaptive Power Control of Obstacle Avoidance System Using Via Motion Context for Visually Impaired Person." International Conference on Cloud Computing and Social Networking (ICCCSN), Apr. 26-27, 2012 4 pages.

Lee et al.; "A Walking Guidance System for the Visually Impaired"; International Journal of Pattern Recognition and Artificial Intelligence; vol. 22; No. 6; 2008; 16 pages.

Mann et al.; "Blind Navigation with a Wearable Range Camera and Vibrotactile Helmet"; $19^{th}$ ACM International Conference on Multimedia; Nov. 28, 2011; 4 pages.

Mau et al.; "BlindAid: An Electronic Travel Aid for the Blind;" The Robotics Institute Carnegie Mellon University; 27 pages; May 2008.

Meijer, Dr. Peter B.L.; "Mobile OCR, Face and Object Recognition for the Blind"; The vOICe, www.seeingwithsound.com/ocr.htm; Apr. 18, 2014; 7 pages.

Merino-Garcia, et al.; "A Head-Mounted Device for Recognizing Text in Natural Sciences"; CBDAR'11 Proceedings of the $4^{th}$ International Conference on Camera-Based Document Analysis and Recognition; Sep. 22, 2011; 7 pages.

Merri et al.; "The Instruments for a Blind Teacher of English: The challenge of the board"; European Journal of Psychology of Education, vol. 20, No. 4 (Dec. 2005), 15 pages.

Newegg; Motorola Behind the Neck Stereo Bluetooth Headphone Black/Red Bulk (S9)—OEM; http://www.newegg.com/Product/Product.aspx?Item=N82E16875982212&Tpk=n82e16875982212.

Newegg; Motorola S10-HD Bluetooth Stereo Headphone w/ Comfortable Sweat Proof Design; http://wwvv.newegg.com/Product/Product.aspx?Item=9SIA0NW2G39901&Tpk=9sia0nw2g39901; 4 pages.

Nordin et al.; "Indoor Navigation and Localization for Visually Impaired People Using Weighted Topological Map"; Journal of Computer Science vol. 5, Issue 11; 2009; 7 pages.

Omron; Optical Character Recognition Sensor User's Manual; 2012; 450 pages.

OrCam; www.orcam.com; Jul. 22, 2014; 3 pages.

Pagliarini et al.; "Robotic Art for Wearable"; Proceedings of EUROSIAM: European Conference for the Applied Mathematics and Informatics 2010; 10 pages.

Rodriquez-Losada et al.; "Guido, The Robotic Smart Walker for the Frail Visually Impaired"; IEEE International Conference on Robotics and Automation (ICRA); Apr. 18-22, 2005; 15 pages.

Science Daily; "Intelligent Walker Designed to Assist the Elderly and People Undergoing Medical Rehabilitation"; http://www.sciencedaily.com/releases/2008/11/081107072015.htm, Jul. 22, 2014; 4 pages.

Shen et al. "Walkie-Markie: Indoor Pathway Mapping Made Easy," $10^{th}$ USENIX Symposium on Networked Systems Design and Implementation (NSDI 13); pp. 85-98, 2013.

Shoval et al.; "Navbelt and the Guidecane—Robotics-Based Obstacle-Avoidance Systems for the Blind and Visually Impaired"; IEEE Robotics & Automation Magazine, vol. 10, Issue 1; Mar. 2003; 12 pages.

Shoval et al.; "The Navbelt—A Computerized Travel Aid for the Blind"; RESNA Conference, Jun. 12-17, 1993; 6 pages.

Singhal; "The Development of an Intelligent Aid for Blind and Old People;" Emerging Trends and Applications in Computer Science (ICETACS), 2013 $1^{st}$ International Conference; pp. 182-185; Sep. 13, 2013.

Sudol et al.; "LookTel—A Comprehensive Platform for Computer-Aided Visual Assistance"; Computer Vision and Pattern Recognition Workshops (CVPRW), 2010 IEEE Computer Society Conference; Jun. 13-18, 2010; 8 pages.

The Nex Band; http://www.mightycast.com/#faq; May 19, 2015; 4 pages.

Treuillet; "Outdoor/Indoor Vision-Based Localization for Blind Pedestrian Navigation Assistance"; WSPC/Instruction File; May 23, 2010; 16 pages.

Trinh et al.; "Phoneme-based Predictive Text Entry Interface"; Proceedings of the 16th International ACM SIGACCESS Conference on Computers & Accessibility; Oct. 2014; 2 pgs.

Tu et al. "Crowdsourced Routing II D2.6" 34 pages; 2012.

Ward et al.; "Visual Experiences in the Blind Induced by an Auditory Sensory Substitution Device"; Journal of Consciousness and Cognition; Oct. 2009; 30 pages.

Wilson, Jeff, et al. "Swan: System for Wearable Audio Navigation"; 11th IEEE International Symposium on Wearable Computers; Oct. 11-13 2007; 8 pages.

Wu et al. "Fusing Multi-Modal Features for Gesture Recognition," Proceedings of the $15^{th}$ ACM on International Conference on Multimodal Interaction, Dec. 9, 2013, ACM, pp. 453-459.

Yabu et al.; "Development of a Wearable Haptic Tactile Interface as an Aid for the Hearing and/or Visually Impaired;" NTUT Education of Disabilities; vol. 13; pp. 5-12; 2015.

Yang, et al.; "Towards Automatic Sign Translation"; The Interactive Systems Lab, Carnegie Mellon University; 2001; 5 pages.

Yi, Chucai; "Assistive Text Reading from Complex Background for Blind Persons"; CBDAR'11 Proceedings of the $4^{th}$ International Conference on Camera-Based Document Analysis and Recognition; Sep. 22, 2011; 7 pages.

Zeng et al.; "Audio-Haptic Browser for a Geographical Information System"; ICCHP 2010, Part II, LNCS 6180; Jul. 14-16, 2010; 8 pages.

Zhang et al.; "A Multiple Sensor-Based Shoe-Mounted User Interface Designed for Navigation Systems for the Visually Impaired"; 5th Annual ICST Wireless Internet Conference (WICON); Mar. 1-3, 2010; 9 pages.

Shidujaman et al.; "Design and navigation Prospective for Wireless Power Transmission Robot;" IEEE; Jun. 2015.

Wang, et al.; "Camera-Based Signage Detection and Recognition for Blind Persons"; $13^{th}$ International Conference (ICCHP) Part 2 Proceedings; Jul. 11-13, 2012; 9 pages.

Paladugu et al.; "GoingEasy® with Crowdsourcing in the Web 2.0 World for Visually Impaired Users: Design and User Study"; Arizona State University; 8 pages.

Katz et al; "NAVIG: Augmented Reality Guidance System for the Visually Impaired"; Virtual Reality (2012) vol. 16; 2012; 17 pages.

Rodríguez et al.; "Assisting the Visually Impaired: Obstacle Detection and Warning System by Acoustic Feedback"; Sensors 2012; vol. 12; 21 pages.

Pawar et al.; "Multitasking Stick for Indicating Safe Path to Visually Disable People"; IOSR Journal of Electronics and Communication Engineering (IOSR-JECE), vol. 10, Issue 3, Ver. II; May-Jun. 2015; 5 pages.

(56) References Cited

OTHER PUBLICATIONS

Parkes, Don; "*Audio Tactile Systems for Designing and Learning Complex Environments as a Vision Impaired Person: Static and Dynamic Spatial Information Access*"; EdTech-94 Proceedings; 1994; 8 pages.
Ramya, et al.; "*Voice Assisted Embedded Navigation System for the Visually Impaired*"; International Journal of Computer Applications; vol. 64, No. 13, Feb. 2013; 7 pages.
Park, Sungwoo; "*Voice Stick*"; www.yankodesign.com/2008/08/21/voice-stick; Aug. 21, 2008; 4 pages.
Rentschler et al.; "*Intelligent Walkers for the Elderly: Performance and Safety Testing of VA-PAMAID Robotic Walker*"; Department of Veterans Affairs Journal of Rehabilitation Research and Development; vol. 40, No. 5; Sep./Oct. 2013; 9 pages.
Pawar et al.; "Review Paper on Multitasking Stick for Guiding Safe Path for Visually Disable People;" *IJPRET*; vol. 3, No. 9; pp. 929-936; 2015.
Ram et al.; "The People Sensor: A Mobility Aid for the Visually Impaired;" 2012 16$^{th}$ International Symposium on Wearable Computers; pp. 166-167; 2012.
Pitsikalis et al. "Multimodal Gesture Recognition via Multiple Hypothese Rescoring." Journal of Machine Learning Research, Feb. 2015, pp. 255-284.
Rodriguez et al; "*CrowdSight: Rapidly Prototyping Intelligent Visual Processing Apps*"; AAAI Human Computation Workshop (HCOMP); 2011; 6 pages.
Ran et al.; "*Drishti: An Integrated Indoor/Outdoor Blind Navigation System and Service*"; Proceeding PERCOM '04 Proceedings of the Second IEEE International Conference on Pervasive Computing and Communications (PerCom'04); 2004; 9 pages.

\* cited by examiner

SYSTEM AND METHOD FOR PROVIDING GUIDANCE OR FEEDBACK TO A USER

BACKGROUND

1. Field

The present disclosure relates to providing information by a device, and more particularly to a system and a method for providing guidance or feedback to a user performing an activity.

2. Description of the Related Art

An individual performing an activity, such as cooking, repairing a vehicle, or playing a sport, may follow a set of instructions. For example, an individual who is cooking or baking may follow a recipe. In another example, an individual who is repairing a component of a vehicle may follow instructions for disassembling the component, repairing the component, and reassembling the component. However, following a set of instructions may not always be convenient. An individual following a recipe may print the recipe on a paper or may view the recipe on a mobile device, such as a tablet or a smartphone. However, the integrity of the paper may become compromised if subjected to water or foods spilling on the paper, and the mobile device may turn off or may dim the display, requiring periodic engagement with the screen. In addition, it is often the responsibility of the individual to ensure the instructions are being followed so that the activity is successfully completed with no other oversight.

Thus, there is a need for systems and methods for providing more convenient guidance and feedback to users.

SUMMARY

What is described is a system for providing guidance or feedback to a user. The system includes a camera configured to detect image data indicating a user performance of an activity. The system also includes a guidance unit connected to the camera. The guidance unit is configured to identify the activity based on image processing of the image data or an identification of the activity from the user. The guidance unit is also configured to determine a criteria associated with the activity. The guidance unit is also configured to determine a user performance of the activity based on the image data. The guidance unit is also configured to determine feedback based on a comparison of the criteria and the user performance of the activity, the feedback indicating an improvement or suggestion for the user. The system also includes an output unit connected to the guidance unit, the output unit configured to output the feedback.

Also described is a device for providing guidance or feedback to a user. The device includes a camera configured to detect image data indicating a user performance of an activity. The device also includes a guidance unit connected to the camera. The guidance unit is configured to identify the activity based on image processing of the image data or an identification of the activity from the user. The guidance unit is also configured to determine a set of instructions associated with the activity. The guidance unit is also configured to determine a current stage of the activity based on the image data. The guidance unit is also configured to determine a next instruction from the set of instructions to provide the user based on the current stage. The device also includes an output unit connected to the guidance unit, the output unit configured to output the next instruction.

Also described is a method for providing guidance or feedback to a user. The method includes detecting, by a camera, image data indicating a user performance of an activity. The method also includes identifying, by a guidance unit, the activity based on image processing of the image data or an identification of the activity from the user. The method also includes determining, by the guidance unit, a criteria or a set of instructions associated with the activity. The method also includes determining, by the guidance unit, a user performance of the activity based on the image data or a current stage of the activity based on the image data. The method also includes determining, by the guidance unit, feedback based on a comparison of the criteria and the user performance of the activity or a next instruction from the set of instructions to provide the user based on the current stage. The method also includes outputting, by an output unit, the feedback or the next instruction.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1A:
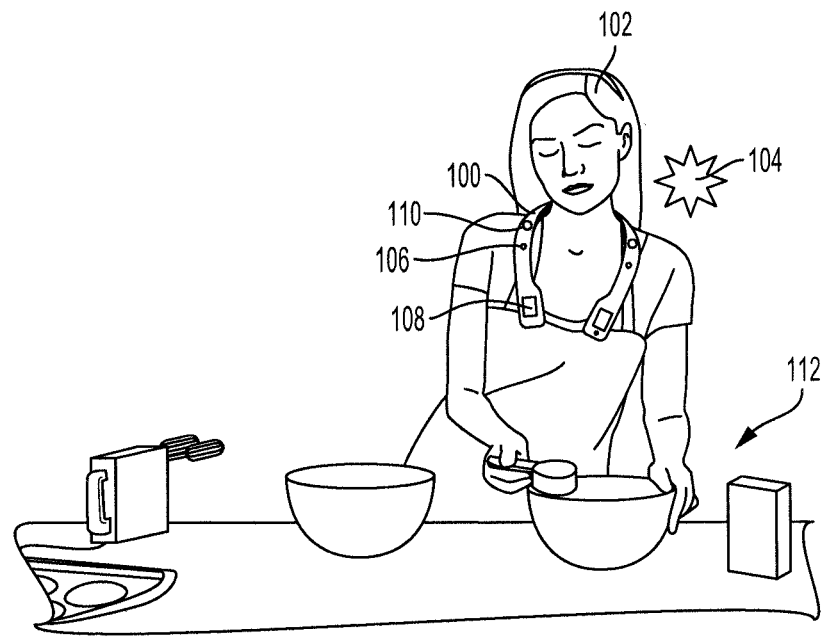
FIG. 1A illustrates an exemplary use of a system for providing guidance or feedback to a user cooking food, according to an embodiment of the present invention.

Disclosed herein are systems and methods for providing guidance or feedback to a user. The systems and methods disclosed herein determine an activity the user is engaged in, and automatically provides guidance or feedback to the user. The activity may be detected by a camera on a device worn by the user, or may be provided to the wearable device by the user. The user receives the guidance or feedback from the wearable device, allowing the user to perform the activity without occupying the user's hands. The guidance or feedback may be suggestions for the user or may be instructions for the user to follow. The systems and methods provide several benefits and advantages, such as providing updated, accurate, and personalized guidance or feedback for the user. Additional benefits and advantages include the user not having to rely on memory to remember instructions for performing an activity. As such, the user may perform the activity at a higher level and may achieve more consistent and better results. Further, the user may be more capable while using the systems and methods disclosed herein, as the user can access instructions on how to perform activities the user may not have previously been capable of performing.

The systems and methods provide additional benefits and advantages such as allowing users to become less reliant on other human beings to teach the users how to do things and inform the users about suggestions or reminders.

An exemplary system includes a camera configured to detect image data indicating a user performance of an activity or a user about to begin an activity. The system also includes a guidance unit connected to the camera. The guidance unit is configured to identify the activity based on image processing of the image data or an identification of the activity from the user. The guidance unit is also configured to determine a criteria associated with the activity. The guidance unit is also configured to determine a user performance of the activity based on the image data. The guidance unit is also configured to determine feedback based on a comparison of the criteria and the user performance of the activity, the feedback indicating an improvement or suggestion for the user. The system also includes an output unit connected to the guidance unit, the output unit configured to output the feedback.

FIGS. 1A-1H illustrate various exemplary situations where the system for providing guidance or feedback to a user may be used. In each of the FIGS. 1A-1H, there is a user 102 of a device 100. The system for providing guidance or feedback to the user includes the device 100. The device 100 is illustrated as a wearable device resembling a necklace, but other devices, such as a wearable smart watch or a smartphone may be used.

The device 100 is configured to provide an output 104 via an output unit including a speaker 110, for example. The output 104 may be an audio output from a speaker 110 or a tactile output from a vibration unit. The output 104 may be guidance or feedback. When the output 104 is feedback, the output 104 may be a suggestion, a reminder, an improvement, or general information for the user 102. When the output 104 is guidance, the output 104 may be an instruction for the user 102 in performing an activity. The device 100 may automatically identify the activity being performed by the user 102 using a camera 106. The user 102 may provide an identification of the activity to the device 100 using an input unit 108. The input unit 108 may be a touchpad, a keyboard, or a microphone, for example.

FIG. 1A illustrates the user 102 making cookies. The device 100 may identify that the user 102 is making cookies. The device 100 may detect image data using a camera 106 and the device 100 may analyze the detected image data to determine that the user 102 is making cookies. For example, the camera 106 detects a cookie box or mix or ingredients to make cookies and determines that the user 102 wants to make cookies. The device 100 may compare the detected image data with a learned model to determine that the activity performed by the user 102 is making cookies. Part of the learned model may be recognition of objects 112 or actions associated with the activity. In FIG. 1A, the learned model may include a bowl, a hand mixer, ingredients such as flour, or the action of scooping flour with a measuring spoon or measuring cup. Alternatively, or in addition, the user 102 may speak into the input unit 108 an indication that the user 102 is making cookies, such as "Hey, I'm making chocolate chip cookies, can you help me?" or "Hey, teach me how to make chocolate chip cookies." In addition, the user 102 may type into the input unit 108 an indication that the activity the user 102 is engaged in is making cookies.

The device 100 may output an output 104 that is feedback. The device 100 may determine, based on image data that the user 102 has not scooped enough flour, and the device 100 may output an output 104 such as "You might want to check how much flour you scooped." The user 102 may prompt the device 100 for feedback using the input unit 108. For example, the user 102 may say "Hey, did I scoop enough flour?" and the device 100 may, based on detected image data, determine a response to the prompt provided by the user 102.

The device 100 may output an output 104 that is guidance. The device 100 may determine, based on image data, that the user has finished performing a step in a series of instructions. For example, the device 100 may detect that the user 102 has finished adding flour to the bowl, and that the user 102 should next add baking soda. The device 100 may provide an output 104 that is an instruction, such as "Next, after the flour, you should add 2 teaspoons of baking soda."

The learned model may be stored locally on the device 100 or remotely. The learned model may be periodically updated. For example, the user 102 may identify a particular chocolate chip cookie recipe the user likes, or a most popular chocolate chip cookie recipe may be provided in the learned model.

Figure 1B:
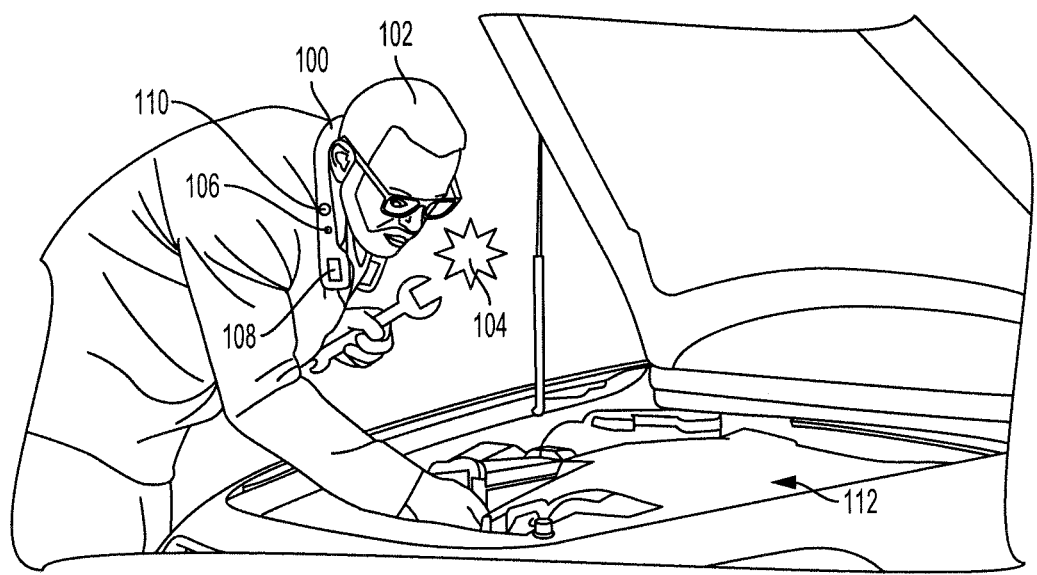
FIG. 1B illustrates an exemplary use of a system for providing guidance or feedback to a user repairing a vehicle, according to an embodiment of the present invention.

Another example embodiment is illustrated in FIG. 1B. In FIG. 1B, the user 102 wearing the device 100 is repairing a vehicle. The device 100 may identify that the user 102 is repairing a vehicle. The device 100 may detect image data using a camera 106 and the device 100 may analyze the detected image data to determine that the user 102 is repairing the vehicle. The device 100 may compare the detected image data with a learned model to determine that the activity performed by the user 102 is repairing the vehicle. In FIG. 1B, the learned model may include objects 112, such as a vehicle, a vehicle part, tools, or the action of engaging the vehicle part with the tool. Alternatively, or in addition, the user 102 may speak into the input unit 108 an indication that the user 102 is repairing a vehicle, such as "Hey, I'm trying to repair this engine for a 1982 Car Make X, Car Model Y, can you help me?" or "Hey, teach me how to replace a gasket in an engine." In addition, the user 102 may type into the input unit 108 an indication that the activity the user 102 is engaged in is repairing a vehicle. As described herein, the learned model may be updated to provide a most up-to-date and accurate guidance or feedback possible.

The device 100 may output an output 104 that is feedback. The device 100 may determine, based on image data that the user 102 has not forgotten to replace a removed engine component, and the device 100 may output an output 104 such as "You might want to check if you replaced all of the bolts." The user 102 may prompt the device 100 for feedback using the input unit 108. For example, the user 102 may say "Hey, did I miss anything when putting this engine back together?" and the device 100 may, based on detected image data, determine a response to the prompt provided by the user 102.

The device 100 may output an output 104 that is guidance. The device 100 may determine, based on image data, that the user has finished performing a step in a series of instructions. For example, the device 100 may detect that the user 102 has finished removing the bolts, and that the user 102 should next remove the cover plate and clean the surface of debris. The device 100 may provide an output 104 that is an instruction, such as "Next, after you remove the bolts, remove the cover plate and clean the surface of any debris."

Figure 1C:
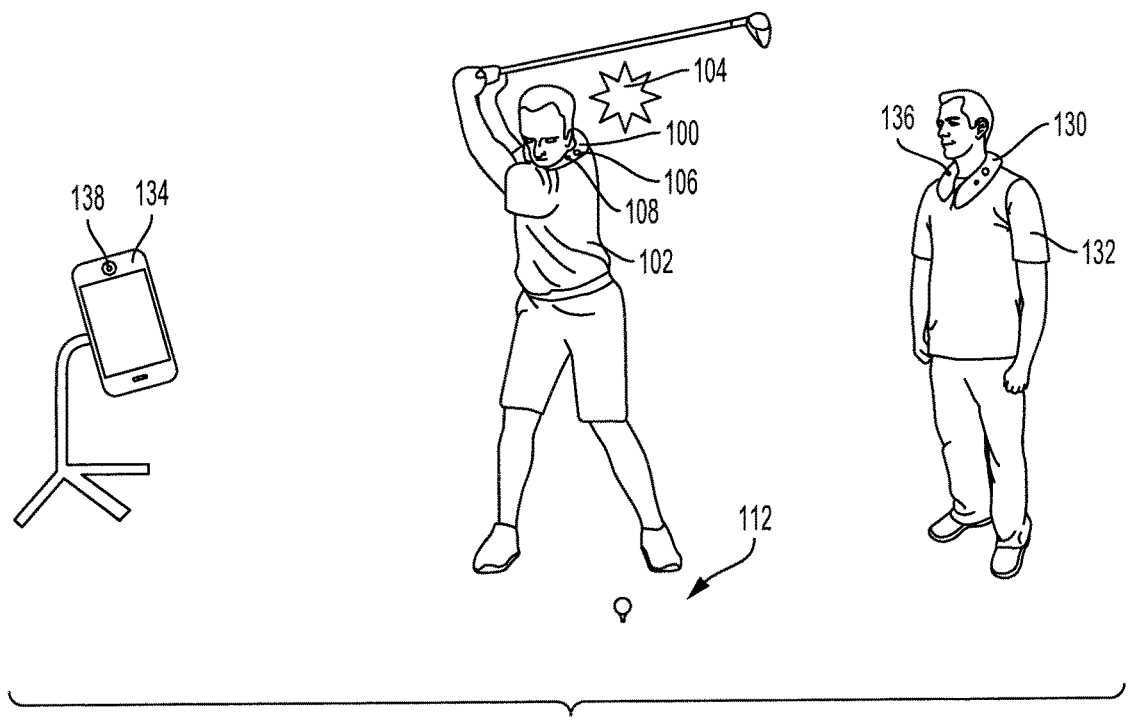
FIG. 1C illustrates an exemplary use of a system for providing guidance or feedback to a user swinging a golf club, according to an embodiment of the present invention.

FIG. 1C illustrates a user 102 wearing a device 100, a second user 132 wearing a second device 130, and a third device 134. The device 100 may also be used with other devices (e.g., second device 130 and third device 134) to provide guidance or feedback to the user 102. In some situations, the camera 106 of the device 100 may be unable to view the user 102 or the user's actions to properly assess the user's performance. In other situations, the device 100 may benefit from having additional image data of different angles of the activity being performed by the user 102 to provide more comprehensive feedback to the user 102.

As illustrated in FIG. 1C, the user 102 is performing an activity of playing golf. The device 100 may identify that the user 102 is playing golf. The device 100 may use location data to determine that the user 102 is playing golf, when the location data indicates that the device 100 and the user 102 are at a golf course.

The device 100 may detect image data using a camera 106 and the device 100 may analyze the detected image data to determine that the user 102 is playing golf. The detected image data may be the user 102 carrying a set of golf clubs. The device 100 may compare the detected image data with a learned model to determine that the activity performed by the user 102 is playing golf. The learned model may include objects 112 such as a golf club, wide areas of grass, or a golf ball. Alternatively, or in addition, the user 102 may speak into the input unit 108 an indication that the user 102 is playing golf, such as "Hey, I'm playing golf, how does my swing look?" or "Hey, teach me how to swing a 5 iron properly." In addition, the user 102 may type into the input unit 108 an indication that the activity the user 102 is engaged in is playing golf.

The device 100 may not be able to view the user's swing and form from the perspective of the user 102. The device 100 may communicate with other devices, such as second device 130 or third device 134, to evaluate the user's actions, to provide feedback. The device 100 may communicate directly with the other devices using a device-to-device protocol such as Bluetooth or Wi-Fi Direct. The device 100 may communicate with the other devices via a remote server, such as a cloud based server, whereby the other devices (e.g., the second device 130 and the third device 134) communicate image data to the cloud based server, and the device 100 retrieves the image data from the cloud based server.

The other devices, such as the second device 130 and the third device 134 may be wearable devices with cameras or may be other devices, such as a tablet, a smartphone, or a camera. In FIG. 1C, the second device 130 is another wearable device similar to the device 100 of the user 102, and the third device is a tablet mounted to a stand. The second device 130 has a camera 136 and the third device has a camera 138.

The second device 130 may detect image data of the user 102 swinging the golf club from an angle that the device 100 is unable to capture using the camera 106 of the device 100. Likewise, the third device 134 may further detect image data of the user 102 swinging the golf club from another angle that neither the device 100 nor the second device 130 are able to capture using their respective cameras.

The device 100, based on the image data from the device 100, the second device 130, and the third device 134, may evaluate the user's performance of the activity based on the image data to provide feedback. The learned model may further include criteria by which the user's actions should be compared and the device 100 may determine the feedback based on a comparison of the user's performance and the criteria.

The device 100 may output an output 104 that is feedback. The feedback may be critiques of the user's performance, such as "You should keep your back straight." The user 102 may prompt the device 100 for feedback using the input unit 108. For example, the user 102 may say "Hey, was my left aim straight?" and the device 100 may, based on detected image data, determine a response to the prompt provided by the user 102.

The device 100 may output an output 104 that is guidance. The device 100 may determine, based on image data, that the user has finished performing a step in a series of instructions. For example, the device 100 may detect that the user 102 has finished gripping the club and getting ready to swing, and that the user 102 should next bring the club back for the backswing. The device 100 may provide an output 104 that is an instruction, such as "Next, after you address the ball, begin your backswing, making sure to keep your left arm straight, your hips turned, your back straight, and your front heel on the ground." The guidance provided by the device 100 may be particularly useful when there are many things to remember at once, and doing so may be challenging for a human being.

Figure 1D:
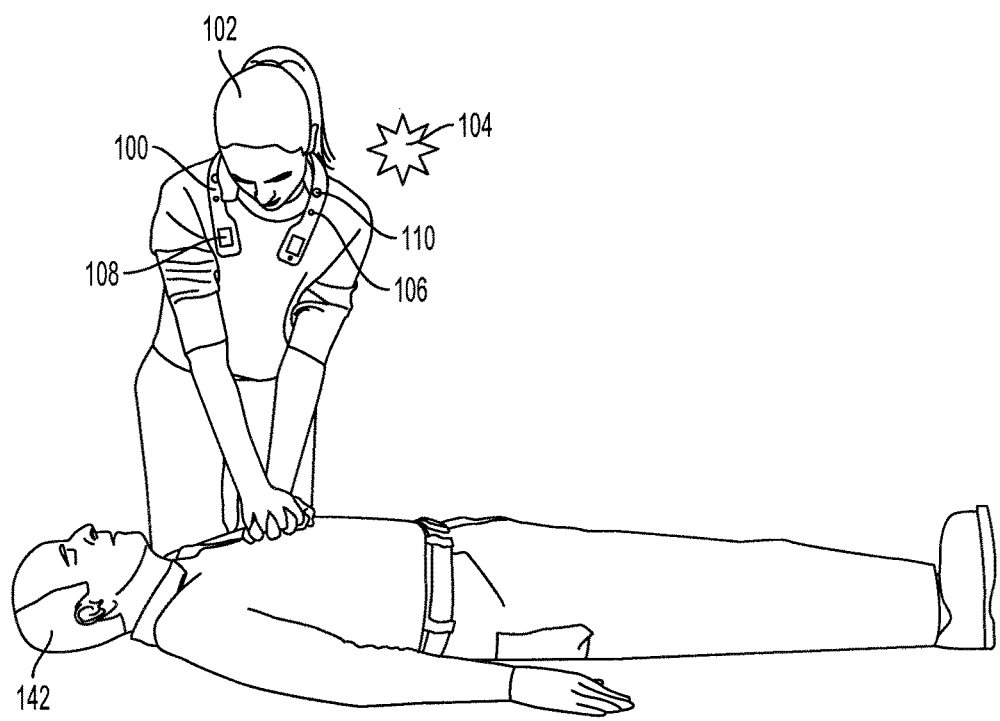
FIG. 1D illustrates an exemplary use of a system for providing guidance or feedback to a user administering first aid, according to an embodiment of the present invention.

The guidance provided by the device 100 may also be particularly useful when the user 102 has never performed a particular activity or when a situation is an emergency. For example, as illustrated in FIG. 1D, the user 102 is administering first aid to a victim 142. The user 102 may be performing cardiopulmonary resuscitation (CPR) on the victim 142.

The device 100 may identify that the user 102 is performing CPR. The device 100 may detect image data using a camera 106 and the device 100 may analyze the detected image data to determine that the user 102 is performing CPR. The device 100 may compare the detected image data with a learned model to determine that the activity performed by the user 102 is performing CPR. Alternatively, or in addition, the user 102 may speak into the input unit 108 an indication that the user 102 is performing CPR, such as "Hey, my friend was drowning, but we got him out of the water and he's not breathing, can you help me?" or "Hey, teach me how to perform CPR." In addition, the user 102 may type into the input unit 108 an indication that the activity the user 102 is engaged in is performing CPR.

The device 100 may output an output 104 that is feedback. The device 100 may determine, based on image data that the user 102 has not performed enough chest compressions, and the device 100 may output an output 104 such as "You are not pumping rapidly enough in your chest compressions— the target is 100-120 times per minute, or more than one per second." The user 102 may prompt the device 100 for feedback using the input unit 108. For example, the user 102 may say "Hey, is this location the right one for chest compressions?" and the device 100 may, based on detected image data, determine a response to the prompt provided by the user 102.

The device 100 may output an output 104 that is guidance. The device 100 may determine, based on image data, that the user has finished performing a step in a series of instructions. For example, the device 100 may detect that the user 102 has finished performing chest compressions, and that the user 102 should next blow into the victim's mouth. The device 100 may provide an output 104 that is an instruction, such as "Next, after chest compressions, you should tilt the victim's head back, lift the chin, pinch the nose, cover the mouth with yours and blow until you can see the victim's chest rise."

As described herein, the learned model and/or other data used by the device 100 to provide guidance or feedback may be stored locally on the device 100 or stored on a remote memory and accessed by the device 100. The learned model and/or other data may be updated periodically so that the feedback and/or guidance provided is up-to-date and current. For example, when general first aid guidelines change, the device 100 is able to provide the updated instructions. In this way, use of the device 100 may be superior to relying on human knowledge, which may become outdated and/or inaccurate.

The device 100 may provide situationally appropriate guidance or feedback without being prompted by the user 102 based on the detected activity. For example, when the device 100 detects an individual in distress, the device 100 may automatically provide CPR instructions to the user 102.

Figure 1E:
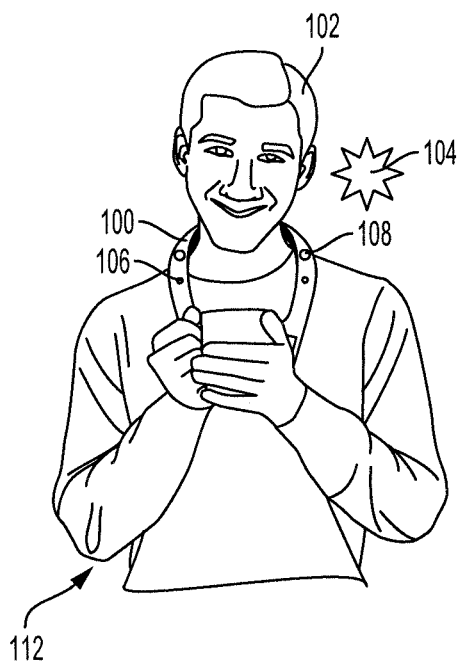
FIG. 1E illustrates an exemplary use of a system for providing guidance or feedback to a user regarding food or drink consumption, according to an embodiment of the present invention.

The output 104 provided by the device may be feedback or a reminder associated with a behavior identified by the user 102. The behavior may be a limitation of an undesirable behavior. For example, as shown in FIG. 1E, the user 102 may indicate to the device 100 that the user would like to limit consumption of a particular beverage, such as soda or coffee. The device 100 may detect, based on image data detected from the camera 106 that the user 102 is consuming the beverage and may provide an output 104 reminding the user 102 of the restriction. The output 104 may be an audio output of "Remember to watch your consumption of coffee." The device 100 may detect an object 112 associated with the particular beverage. The output 104 may be a tactile output of a series of vibrations when the device 100 determines the user 102 is participating in the undesirable behavior.

The behavior may also be a limitation of calories consumed throughout the day. The camera 106 may detect image data of food as the user 102 is eating the food. The device 100 may identify the food being eaten based on the image data, and may determine nutritional data associated with the identified food. The nutritional data may be stored in a local or remote memory or may be provided by the user 102. The user 102 may provide the nutritional data by identifying values of categories, such as calories, fat, sugar, or ingredients. The user 102 may also provide the nutritional data by holding up a nutritional label associated with the food so the camera 106 may capture an image of the nutritional label.

The device 100 may determine nutritional feedback for the user 102, such as "You have consumed your daily allotment of sugar and it is only 11 AM. You may consider limiting your sugar intake for the rest of the day or exercising." The device 100 may include an inertial measurement unit (IMU) for detecting user activity to determine an approximate calories burned by the user 102. The nutritional feedback provided by the device 100 may vary based on the user's activity, as detected by the IMU.

Figure 1G:
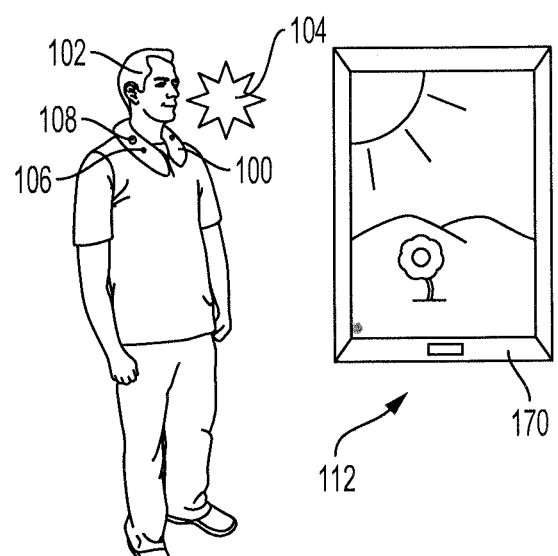
FIG. 1G illustrates an exemplary use of a system for providing guidance or feedback to a user regarding speech behavior, according to an embodiment of the present invention.
Figure 1F:
FIG. 1F illustrates an exemplary use of a system for providing guidance or feedback to a user regarding a piece of art, according to an embodiment of the present invention.

In addition to the image data detected by the camera 106, the device 100 may use a microphone to detect audio data. The device 100 may use the audio data to assist in determining the user 102 is participating in an activity. For example, as shown in FIG. 1F, the user 102 may instruct the device 100 to notify the user when the user says the word "umm." The device 100 may detect audio data using the microphone, and when the device 100 detects the user 102 has said "umm," the device 100 may output an output 104 that is an audio output or a tactile output to indicate to the user 102 that the user 102 has said "umm."

The output 104 may be information associated with a detected object. For example, as shown in FIG. 1G, the device 100 may determine, using image data detected by the camera 106, that the user 102 is looking at an object 112, such as a painting 170. The device 100 may identify the painting 170 by comparing the image data associated with the painting with a database of paintings. In addition, the device 100 may determine a location of the user 102 based on the location data and may identify a painting associated with the location, as the location may be a museum or other landmark.

In the example embodiment of FIG. 1G, the output 104 may be information regarding the painting 170, such as the artist, the year it was painted, the style of painting, the circumstances surrounding the painting, and a history of owners of the painting. The user 102 may provide an input to the device 100 inquiring about the object 112 (e.g., painting 170), or the device 100 may automatically provide the output 104 based on identifying the object 112 based on the image data.

The output 104 may be a location-based reminder to the user 102. For example, the user 102 may indicate to the device 100 that the user 102 would like to be reminded when the user 102 leaves his house, that the user 102 should make sure he has his wallet, keys, and cell phone. The device 100 may detect, based on location data detected by a GPS unit, the location of the user 102. When the user 102 is in a first location within the user's home and then goes to a second location outside of the user's home (as detected by the location data), the device 100 may provide the output 104 reminding the user 102. The output 104 may be an audio output such as "Don't forget your keys, wallet, and phone," or may be a tactile output of a series of vibrations.

Figure 2:
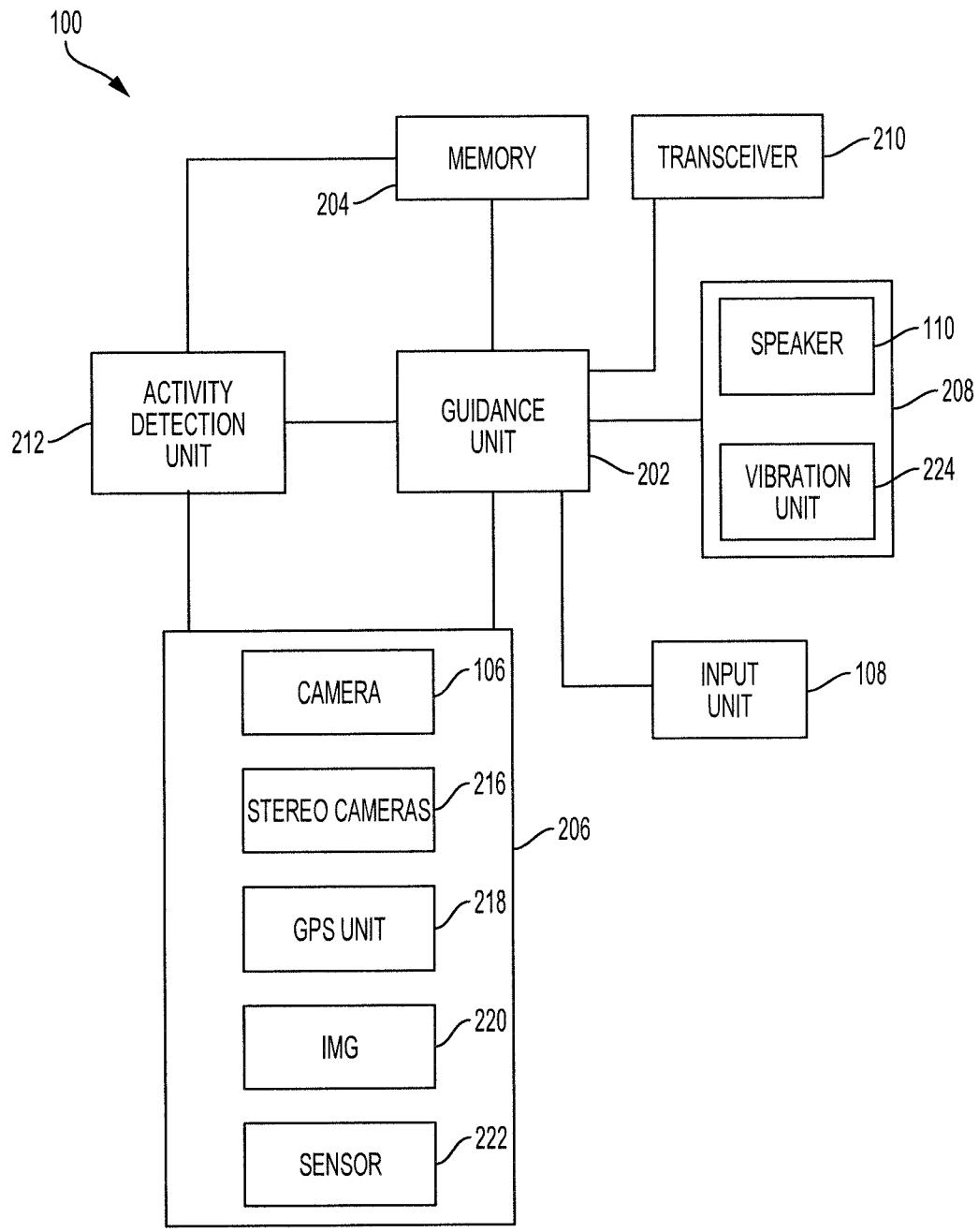
FIG. 2 is a block diagram of components of a system for providing guidance or feedback to a user, according to an embodiment of the present invention.

In one implementation, and with reference to FIG. 2, a device 100 includes a guidance unit 202, connected to a memory 204, a sensor array 206, an output unit 208, a transceiver 210, an activity detection unit 212, and an input unit 108.

The guidance unit 202 may be one or more computer processors such as an ARM processor, DSP processor, distributed processor, microprocessor, controller, or other processing device. The guidance unit 202 may be located in the device 100, may be a remote processor or it may be a pairing of a local and a remote processor.

The memory 204 may be one or any combination of the following: a RAM or other volatile or nonvolatile memory, a non-transitory memory or a data storage device, such as a hard disk drive, a solid state disk drive, a hybrid disk drive or other appropriate data storage. The memory 204 may further store machine-readable instructions which may be loaded into or stored in the memory 204 and executed by the guidance unit 202. As with the guidance unit 202, the memory 204 may be positioned on the device 100, may be positioned remote from the device 100 or may be a pairing of a local and a remote memory. The memory 204 may also store learned model data, such that the activity detection unit 212 may compare the image data to the learned model data to determine an activity and/or the guidance unit 202 may compare the image data to the learned model data to determine guidance or feedback. The memory 204 may also store past performance data associated with the user performing the activity. The output 104 may be determined based on the past performance data. For example, in FIG. 1A when the user 102 is making cookies, the output may include a reminder that the last time the user made cookies, the user 102 forgot to take them out of the oven in time. In another example, in FIG. 1C when the user is playing golf, the output may include a reminder that the user's average score for this particular course is 82, that the user 102 typically shoots par on this particular hole, or that the user should use a particular club for that particular hole.

The sensor array 206 includes a camera 106, stereo cameras 216, a GPS unit 218, an inertial measurement unit (IMU) 220, and a sensor 222. The stereo cameras 216 may be a stereo camera pair including two cameras offset by a known distance. In that regard, the guidance unit 202 may receive image data from the stereo cameras 216 and may determine depth information corresponding to objects in the environment based on the received image data and the known distance between the cameras of the stereo cameras 216. The stereo cameras 216 may be used instead of or in conjunction with the camera 106 to detect image data. The sensor 222 may be one or more sensors which provide further information about the environment in conjunction with the rest of the sensor array 206 such as one or more of a temperature sensor, an air pressure sensor, a moisture or humidity sensor, a gas detector or other chemical sensor, a sound sensor, a pH sensor, a smoke detector, an altimeter, a depth gauge, a compass, a motion detector, a light sensor, or other sensor. The GPS unit 218 may detect location data and may be used to determine a geographical location. The map data stored in the memory 204 may also be used to determine the geographical location.

The output unit 208 includes a speaker 110 and a vibration unit 224. The speaker 110 may be one or more speakers or other devices capable of producing sounds and/or vibrations. The vibration unit 224 may be one or more vibration motors or actuators capable of providing haptic and tactile output.

The transceiver 210 can be a receiver and/or a transmitter configured to receive and transmit data from a remote data storage or other device. The transceiver 210 may include an antenna capable of transmitting and receiving wireless communications. For example, the antenna may be a Bluetooth or Wi-Fi antenna, a cellular radio antenna, a radio frequency identification (RFID) antenna or reader and/or a near field communication (NFC) unit.

Figure 3:
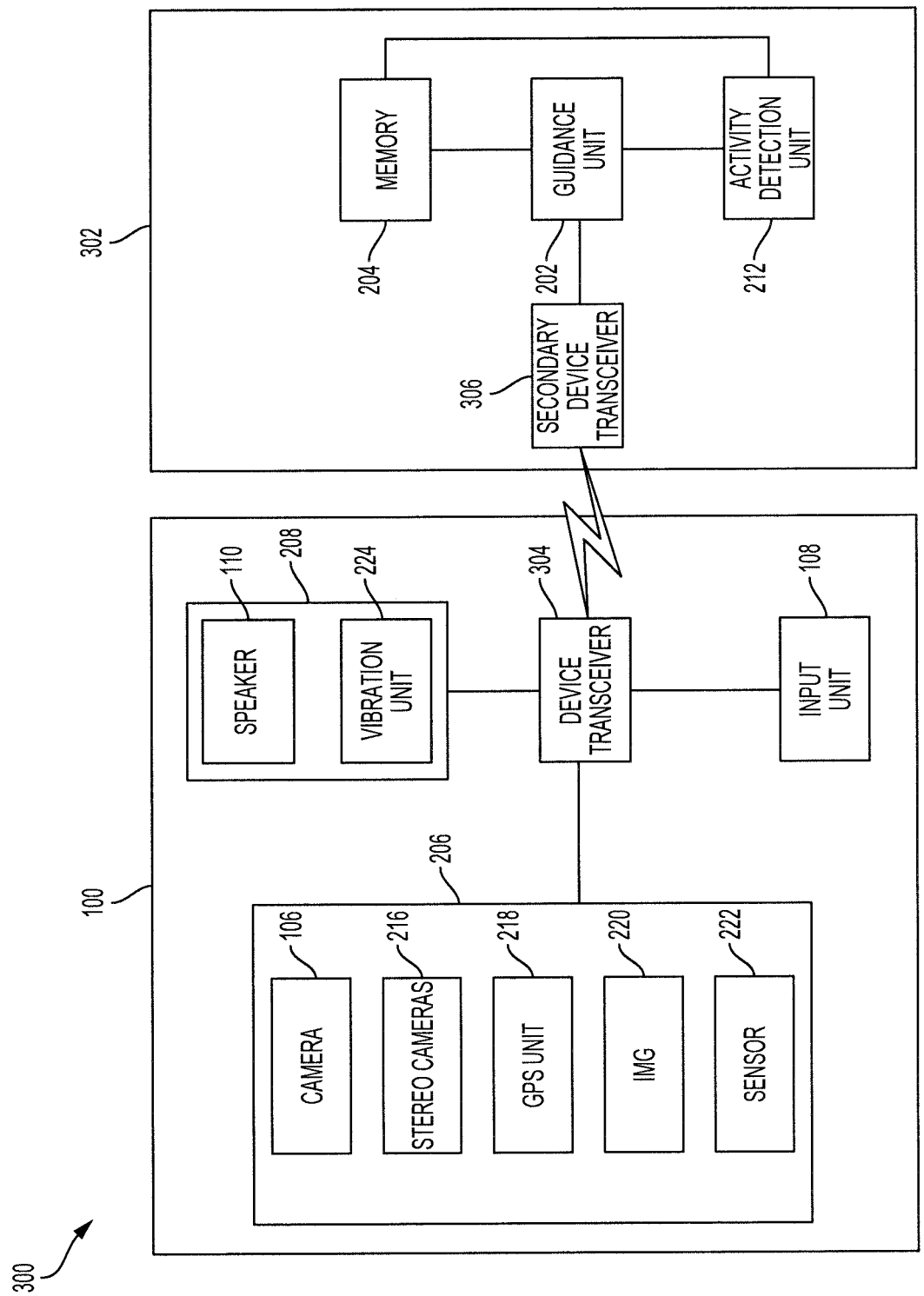
FIG. 3 is a block diagram of components of a system for providing guidance or feedback to a user, according to another embodiment of the present invention.

In another implementation and with reference to FIG. 3, the system 300 may include a device 100 and a secondary device 302. The device 100 is a wearable device, as described herein and includes the sensor array 206, the input unit 108, the output unit 208, and the device transceiver 304. The secondary device 302 may be a device communicatively coupled with the device 100 and configured to perform the processing of the detected data.

The secondary device 302 may be a smartphone or tablet and includes the guidance unit 202, memory 204, a secondary device transceiver 306, and an activity detection unit 212. In the system 300 of FIG. 3, the device 100 may not be responsible for the processing of the detected data, such as the image data and the location data. The device 100 may communicate the detected data to the secondary device 302 via the respective transceivers (device transceiver 304 and secondary device transceiver 306).

Figure 4:
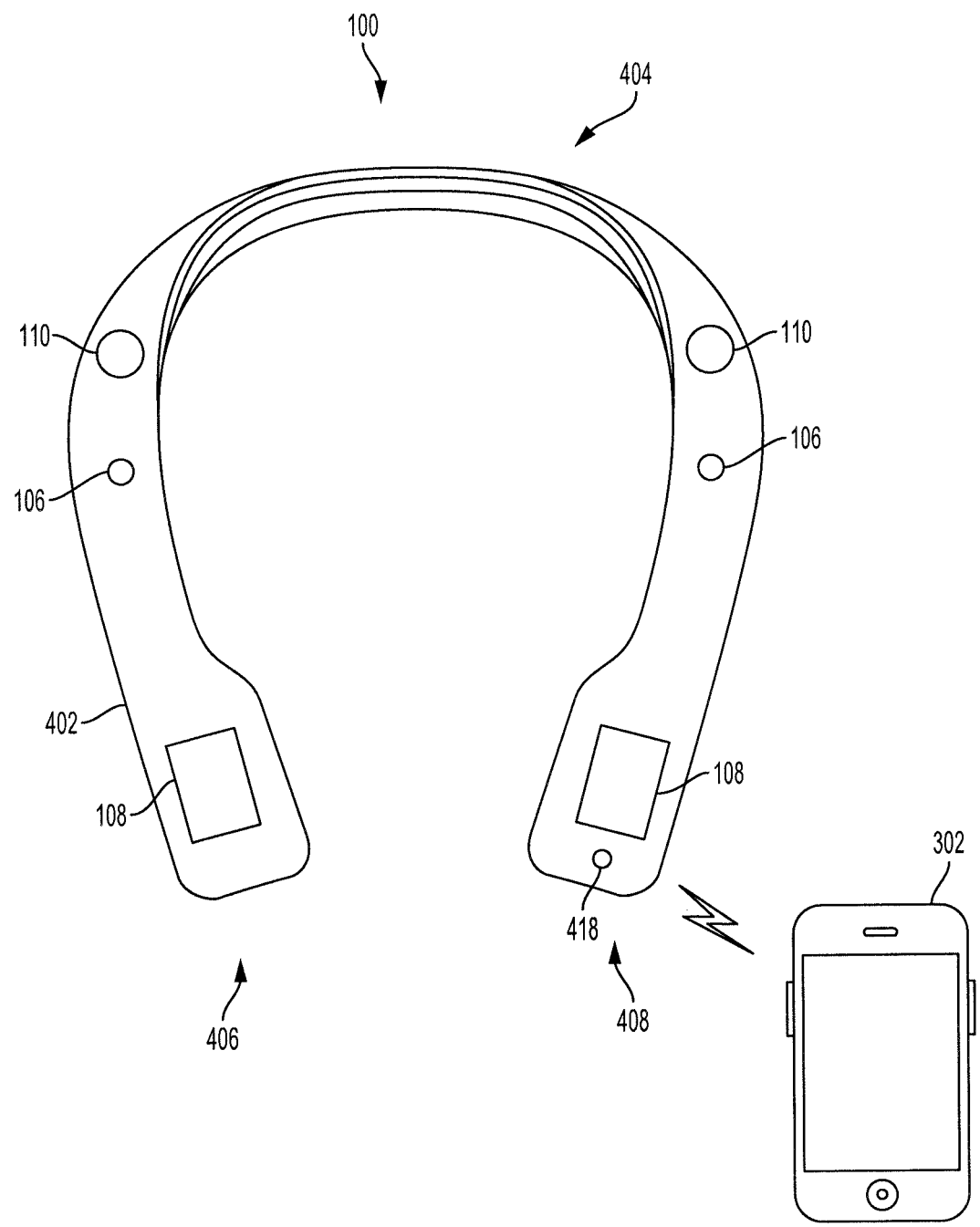
FIG. 4 illustrates an exemplary device, according to an embodiment of the present invention.

Turning to FIG. 4, the device 100 may be a wearable device, which has an outer casing, or body 402 having a shape designed to be worn by a user. In particular, the body 402 has a neck portion 404 designed to rest against a back of a neck of the user. The body 402 also includes a first side portion 406 and a second side portion 408 each configured to extend across a shoulder of the user and to rest on a front of the user. In that regard, the wearable device 100 may be worn in a similar manner as a necklace. Although the disclosure is directed to the wearable device 100 having the U-shape, one skilled in the art will realize that the features described herein can be implemented in a wearable computing device having another shape such as eyeglasses or earpieces.

The wearable device 100 includes multiple components capable of receiving or detecting data. For example, the wearable device 100 may include an input unit 108, a microphone 418, and a camera 106 and/or a stereo pair of cameras (e.g., stereo cameras 216), each as described herein. The input unit 108 may include one or more buttons and/or a touchpad. Each of the input unit 108, the camera 106, and the microphone 418 may be physically attached to the body 402.

In some embodiments, the microphone 418 is part of the input unit 108. The microphone 418 may be capable of detecting audio data corresponding to the environment of the wearable device 100. For example, the microphone 418 may be capable of detecting speech data corresponding to speech of the user or of another person. In some embodiments, the user may provide input data to the guidance unit 202 by speaking commands that are received by the microphone 418. The microphone 418 may also be capable of detecting other sounds in the environment such as a scream, a siren from an emergency vehicle, or the like.

The wearable device 100 includes one or more output devices including speakers 110. The speakers 110 are physically attached to the body 402. Each of the speakers 110 is configured to output an audio output based on an instruction from the guidance unit 202. The speakers 110 may be part of the output unit 208, as described herein.

In some embodiments, as shown in FIG. 2, the wearable device 100 also includes the guidance unit 202, the memory 204, and the activity detection unit 212 physically within the wearable device 100.

In other embodiments, as shown in FIG. 3, the wearable device 100 only includes the camera 106, the input unit 108, and the speakers 110 physically within the wearable device 100. In these embodiments, the guidance unit 202, the memory 204 and the activity detection unit 212 are physically located in a secondary device 302, such as a smartphone or a tablet computer. As described herein, the components located in the wearable device 100 and the components located in the secondary device 302 are communicatively coupled and may communicate via respective transceivers configured to transmit and receive data (e.g., device transceiver 304 and secondary device transceiver 306).

Figure 5:
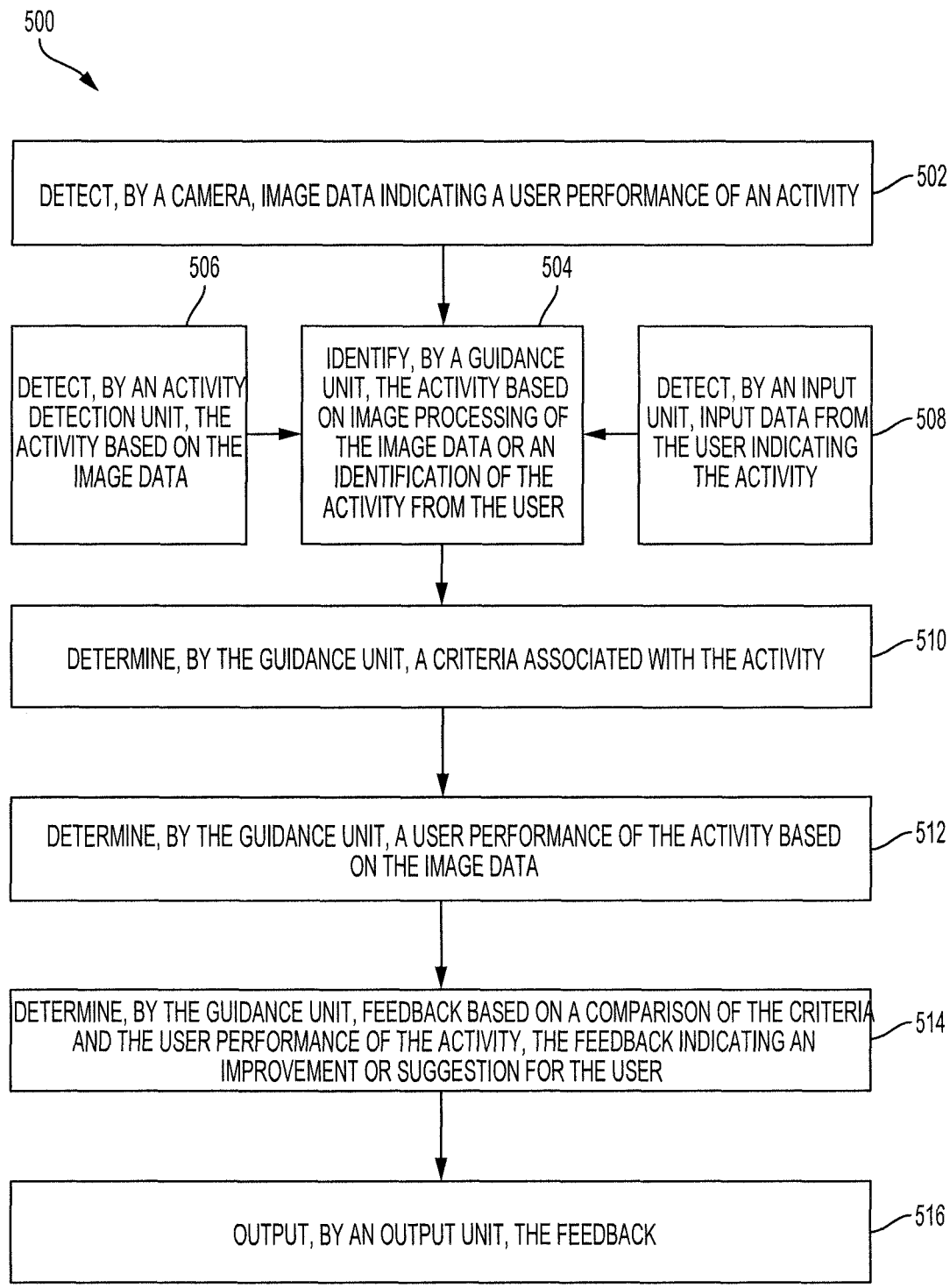
FIG. 5 illustrates a method for providing feedback to a user of a device, according to an embodiment of the present invention.

With reference now to FIG. 5, a method 500 may be used by a device (e.g., device 100) or a system (e.g., system 300) for providing feedback to a user.

The image data is detected by the camera 106 and/or the stereo cameras 216 of the device 100 (step 502). The image data may indicate a user performance of an activity. The guidance unit 202 identifies the activity (step 504). The activity detection unit 212 connected to the guidance unit 202 may detect the activity based on the image data, and the activity detection unit 212 may communicate the identified activity to the guidance unit 202 (step 506). Alternatively, or in addition, the input unit 108 may detect input data from the user indicating the activity and the input unit 108 may communicate the identified activity to the guidance unit 202 (step 508).

The guidance unit 202 determines a criteria associated with the activity (step 510). The criteria associated with the activity may be determined based on the learned model stored in the memory 204. The guidance unit 202 may analyze the learned model to determine a criteria to identify in order to determine whether the user 102 is properly performing the activity.

The guidance unit 202 determines a user performance of the activity based on the image data (step 512). The guidance unit 202 may perform image processing on the image data to construct a model of the user performance.

Figure 1H:
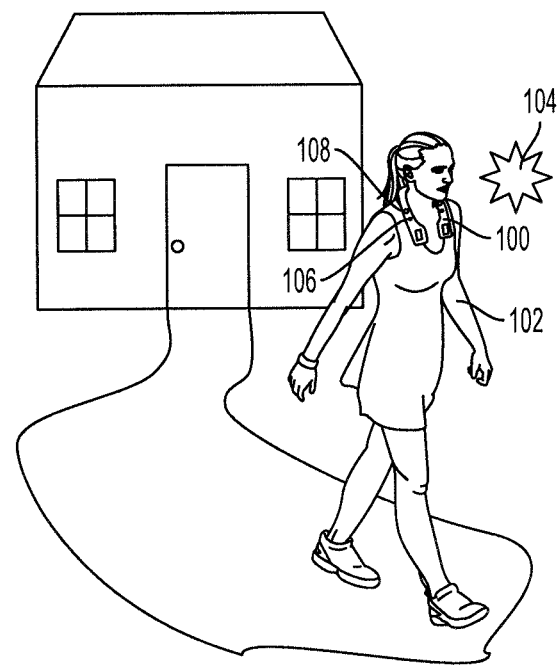
FIG. 1H illustrates an exemplary use of a system for providing guidance or feedback to a user regarding reminders for when the user leaves the user's house, according to an embodiment of the present invention.

The guidance unit 202 determines feedback based on a comparison of the criteria and the user performance of the activity (step 514). The feedback indicates an improvement or suggestion for the user, such as a suggestion to check an amount of an ingredient in a recipe (as shown in FIG. 1A), an improvement to the user's form in a sports activity (as shown in FIG. 1C), a suggestion to the user 102 in the form of relevant information regarding an object near the user 102 (as shown in FIG. 1G), or a suggestion to the user 102 to make sure the user has certain items in the user's possession (as shown in FIG. 1H).

The guidance unit 202 communicates the feedback to the output unit 208 and the output unit 208 outputs the feedback to the user 102 (step 516). For example, the output unit 208 includes a speaker 110 and the speaker outputs an audio output of the feedback.

Figure 6:
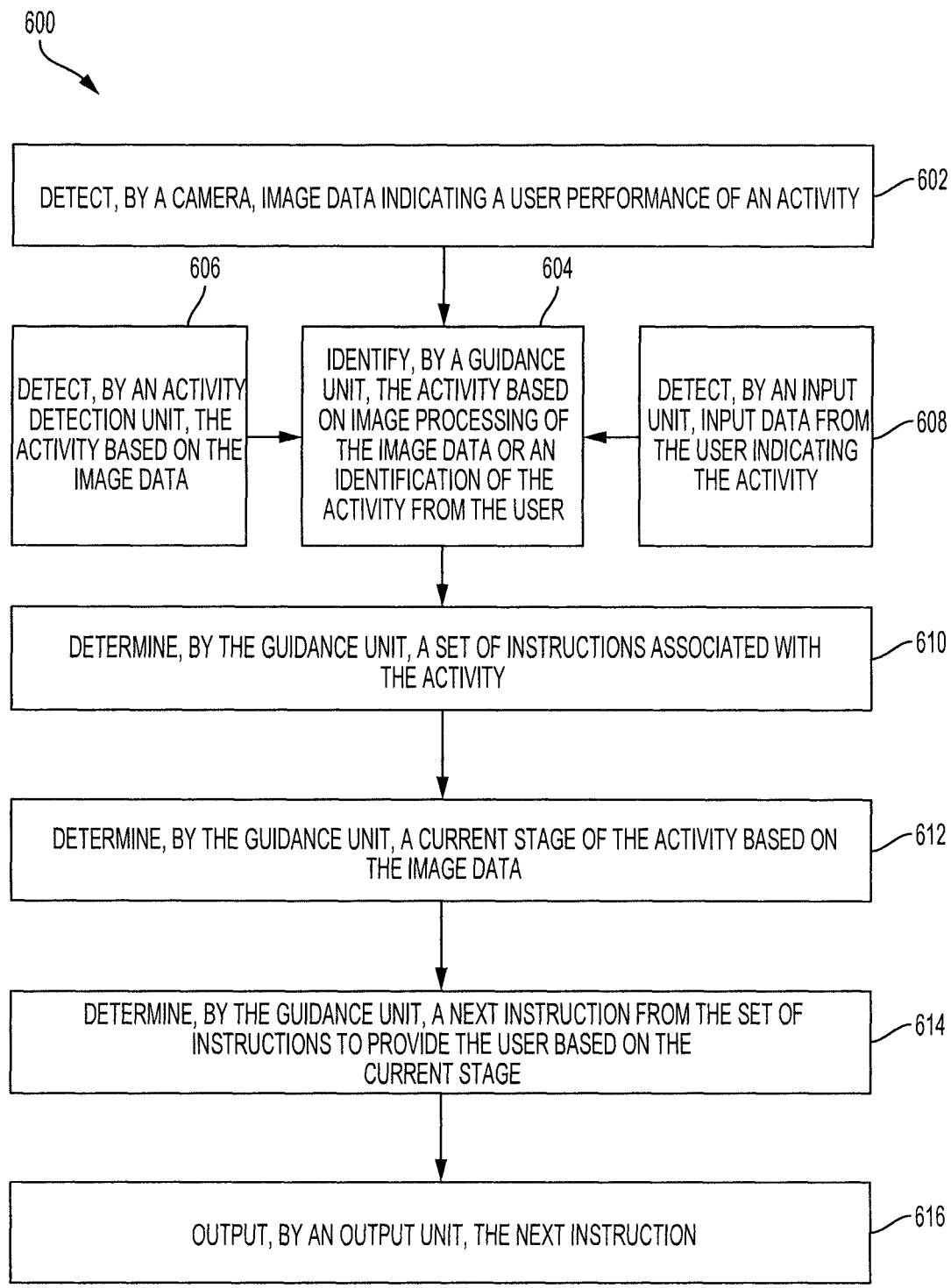
FIG. 6 illustrates a method for providing guidance to a user of a device, according to an embodiment of the present invention.

With reference now to FIG. 6, a method 600 may be used by a device (e.g., the device 100) or a system (e.g., the system 300) for providing guidance to a user.

The image data is detected by the camera 106 and/or the stereo cameras 216 of the device 100 (step 602). The image data may indicate a user performance of an activity. The guidance unit 202 identifies the activity (step 604). An activity detection unit 212 connected to the guidance unit 202 may detect the activity based on the image data, and the activity detection unit 212 may communicate the identified activity to the guidance unit 202 (step 606). Alternatively, or in addition, the input unit 108 may detect input data from the user indicating the activity and the input unit 108 may communicate the identified activity to the guidance unit 202 (step 608).

The guidance unit 202 determines a set of instructions associated with the activity (step 610). The set of instructions associated with the activity may be determined based on the learned model stored in the memory 204. The guidance unit 202 may analyze the learned model to determine a set of instructions to provide to the user 102 or the guidance unit 202 may retrieve the set of instructions from the memory 204. The set of instructions in the memory 204 may be indexed by activity, allowing the guidance unit 202 to retrieve a set of instructions corresponding to a given activity.

The guidance unit 202 determines a current stage of the activity based on the image data (step 612). The guidance unit 202 may perform image processing on the image data to determine an action being performed, and the determined action being performed may be associated with a corresponding current stage of the activity.

The guidance unit 202 determines a next instruction from the set of instructions to provide the user based on the current stage (step 614). The set of instructions may be an ordered list of instructions such that for each instruction there is a next instruction, unless the current instruction is the final stage of the activity. For example, the current stage of the activity may be adding flour to a bowl and the next instruction may be to add chocolate chips (as shown in FIG. 1A).

The guidance unit 202 communicates the next instruction to the output unit 208 and the output unit 208 outputs the next instruction to the user 102 (step 616). For example, the output unit 208 includes a speaker 110 and the speaker 110 outputs an audio output of the next instruction.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A wearable neck device for providing guidance or feedback to a user, the wearable neck device comprising:
 a body having a neck portion configured to rest against a back of a neck of the user, a first side portion connected to the neck portion, and a second side portion connected to the neck portion, the first side portion configured to extend across a first shoulder of the user and rest on a front body portion of the user and the second side portion configured to extend across a second shoulder of the user and rest on the front body portion of the user;
 a camera located on the first side portion or the second side portion and configured to detect image data of a first angle of a user performance of an activity;
 a GPS unit located within the body and configured to detect location data;
 a memory located within the body and configured to store a learned model associated with the activity;
 an activity detection unit located in the body, connected to the camera and the GPS unit, and configured to automatically analyze the image data to identify a presence of one or more objects associated with the activity, compare the one or more objects associated with the activity to the learned model and identify the activity based on the location data and the comparison of the one or more objects associated with the activity to the learned model;

a guidance unit located in the body, connected to the camera and the IMU, and configured to:
  obtain, from a second camera of another device, additional image data of a second angle of the user performance of the activity,
  determine a series of instructions associated with the activity and including a plurality of steps to be performed by the user based on the learned model,
  determine an action being performed within the detected image data,
  determine a current step of the plurality of steps of the series of instructions associated with the activity that is being performed based on the action,
  determine that the current step of the activity has been completed based on the image data of the first angle of the user performance of the activity and the additional image data of the second angle of the user performance of the activity, and
  determine an instruction associated with a next step within the series of instructions in response to determining that the current step has been completed; and
an output unit located on the body, connected to the guidance unit, and configured to output the instruction to the user.

2. The wearable neck device of claim 1, further comprising an input unit configured to detect input data from the user identifying the activity.

3. The wearable neck device of claim 1, wherein the learned model stored in the memory is periodically updated.

4. The wearable neck device of claim 1, wherein the output unit includes a speaker configured to provide an audio output or a vibration unit configured to provide a tactile output.

5. The wearable neck device of claim 1, wherein the one or more objects identified by the activity detection unit are one or more stationary objects unconnected to the user.

6. A wearable neck device for providing guidance or feedback to a user, the wearable neck device comprising:
  a body having a neck portion configured to rest against a back of a neck of the user, a first side portion connected to the neck portion, and a second side portion connected to the neck portion, the first side portion and the second side portion configured to extend across a shoulder of the user and rest on a front body portion of the user;
  a camera located on the first side portion or the second side portion and configured to detect image data of a first angle of a user performance of an activity;
  an inertial measurement unit (IMU) located within the body and configured to detect movement data associated with the user during the user performance of the activity;
  a GPS unit located within the body and configured to detect location data;
  an activity detection unit connected to the camera and the GPS unit, and configured to:
    automatically analyze the image data to identify the activity based on a presence of one or more objects associated with the activity, and
    identify the activity based on the presence of the one or more objects associated with the activity and the location data;
  a guidance unit connected to the camera and the IMU, and configured to:
    obtain, from a second camera of another device, additional image data of a second angle of the user performance of the activity,
    determine a series of instructions associated with the activity and including a plurality of steps to be performed by the user,
    determine an action being performed within the image data,
    determine a current step of the plurality of steps of the series of instructions associated with the activity that is being performed based on the image data, the additional image data and the movement data,
    determine that the current step of the activity has been completed based on the image data of the first angle of the user performance of the activity and the additional image data of the second angle of the user performance of the activity, and
    determine a instruction associated with a next step within the series of instructions; and
  an output unit connected to the guidance unit, the output unit configured to output the instruction.

7. The wearable neck device of claim 6, further comprising an input unit configured to detect input data from the user indicating the activity.

8. The wearable neck device of claim 6, further comprising:
  a memory configured to store a learned model;
  wherein the guidance unit is configured to determine that the current step of the activity has been completed by comparing the image data to the learned model stored in the memory.

9. The wearable neck device of claim 6, wherein the output unit includes a speaker configured to provide an audio output or a vibration unit configured to provide a tactile output.

10. A method of providing guidance or feedback to a user of a wearable neck device, the method comprising:
  providing, by the wearable neck device, a body having a neck portion configured to rest against a back of a neck of the user, a first side portion connected to the neck portion, and a second side portion connected to the neck portion, the first side portion configured to extend across a first shoulder of the user and rest on a front body portion of the user and the second side portion configured to extend across a second shoulder of the user and rest on the front body portion of the user;
  detecting, by a camera located on the first side portion or the second side portion of the body of the wearable neck device, image data of a first angle of a user performance of an activity;
  detecting, by a GPS unit, location data associated with the wearable neck device;
  storing, by a memory located within the body, a learned model associated with the activity;
  automatically analyzing, by an activity detection unit, the image data to identify a presence of one or more objects;
  identifying, by the activity detection unit, the presence of the one or more objects associated with the activity;
  comparing, by the activity detection unit, the one or more objects associated with the activity to the learned model;
  identifying, by the activity detection unit, the activity based on the location data and the comparison of the one or more objects associated with the activity to the learned model;
  obtaining, by a guidance unit and from a second camera of another device, additional image data of a second angle of the user performance of the activity;

determining, by the guidance unit, a series of instructions associated with the activity and including a plurality of steps to be performed by the user based on the learned model;

determining, by the guidance unit, an action being performed within the image data;

determining, by the guidance unit, a current step of the plurality of steps of the series of instructions associated with the activity that is being performed based on the action;

determining, by the guidance unit, that the current step of the activity has been completed based on the image data of the first angle of the user performance of the activity and the additional image data of the second angle of the user performance of the activity;

determining, by the guidance unit, an instruction associated with a next step within the series of instructions; and outputting, by an output unit located on the body, the instruction.

11. The method of claim 10, wherein identifying the activity includes receiving, by an input unit, input data from the user indicating the activity.

12. The method of claim 10, wherein the method further comprises periodically updating the learned model stored in the memory.

\* \* \* \* \*